(12) United States Patent
Gyoten

(10) Patent No.: US 6,587,248 B1
(45) Date of Patent: Jul. 1, 2003

(54) OPTICAL MODULATOR

(75) Inventor: Takaaki Gyoten, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 21 days.

(21) Appl. No.: 09/868,100

(22) PCT Filed: Oct. 13, 2000

(86) PCT No.: PCT/JP00/07118

§ 371 (c)(1),
(2), (4) Date: Aug. 8, 2001

(87) PCT Pub. No.: WO01/27911

PCT Pub. Date: Apr. 19, 2001

(30) Foreign Application Priority Data

Oct. 15, 1999 (JP) .......................................... 11-293307

(51) Int. Cl.[7] ................................................ G02F 1/03
(52) U.S. Cl. ........................ 359/245; 359/237; 359/238
(58) Field of Search ................................ 359/245, 237, 359/238, 276, 289, 290, 291, 264; 353/31, 34, 37; 349/74, 88, 89; 348/207, 99, 222.1, 234, 396.1, 663

(56) References Cited

U.S. PATENT DOCUMENTS

| | | | | |
|---|---|---|---|---|
| 3,910,679 A | * | 10/1975 | Rushworth et al. | ......... 359/264 |
| 5,337,171 A | * | 8/1994 | Mase et al. | ................... 349/74 |
| 5,546,128 A | * | 8/1996 | Nakagakiuchi et al. | ..... 348/362 |
| 5,614,961 A | * | 3/1997 | Gibeau et al. | ............... 348/750 |
| 5,815,128 A | * | 9/1998 | Hoshino et al. | ............... 345/89 |

FOREIGN PATENT DOCUMENTS

| | | | | |
|---|---|---|---|---|
| JP | 2000-338459 | * | 12/0000 | ........... G02F/1/133 |
| JP | 2-73225 | * | 3/1990 | ........... G02F/1/133 |
| JP | 5-257124 | * | 10/1993 | ........... G02F/1/133 |
| JP | 5-273523 | * | 10/1993 | ........... G02F/1/133 |
| JP | 8-334742 | * | 12/1996 | ........... G02F/1/133 |
| JP | 2000-148071 | * | 5/2000 | ........... G09G/3/20 |

* cited by examiner

Primary Examiner—Jordan M. Schwartz
Assistant Examiner—Jessica Stultz
(74) Attorney, Agent, or Firm—Wenderoth, Lind & Ponack, L.L.P.

(57) ABSTRACT

A light modulation apparatus using a light source and a device for ON/OFF control an output light of the light source is provided. The apparatus is capable of increasing the number of gradations of light outputted from the device without increasing the frequency of a clock signal that serves as a unit for ON/OFF controlling the output light from the light source. A light intensity modulation circuit generates, based on a luminance signal YS and a synchronizing signal, an intensity modulating signal for output to a power supply, thereby causing a light source to output light intensity-modulated according to the luminance signal. A pulse-width modulation circuit generates, based on the luminance signal YS, the synchronizing signal, and the clock signal, a pulse-width modulating signal for output to a light valve, thereby causing the light valve to output light modulated in pulse width according to the luminance signal.

6 Claims, 21 Drawing Sheets

| INPUT | 0 | 1 | 2 | 4 | 8 |
|---|---|---|---|---|---|
| OUTPUT | 0 | 1 | 1 | 2 | 4 |

141

112

| DATA | 0 | 1 | 2 | 4 | 8 |
|---|---|---|---|---|---|
| OUTPUT | 0 | 0 | 1 | 1 | 1 |

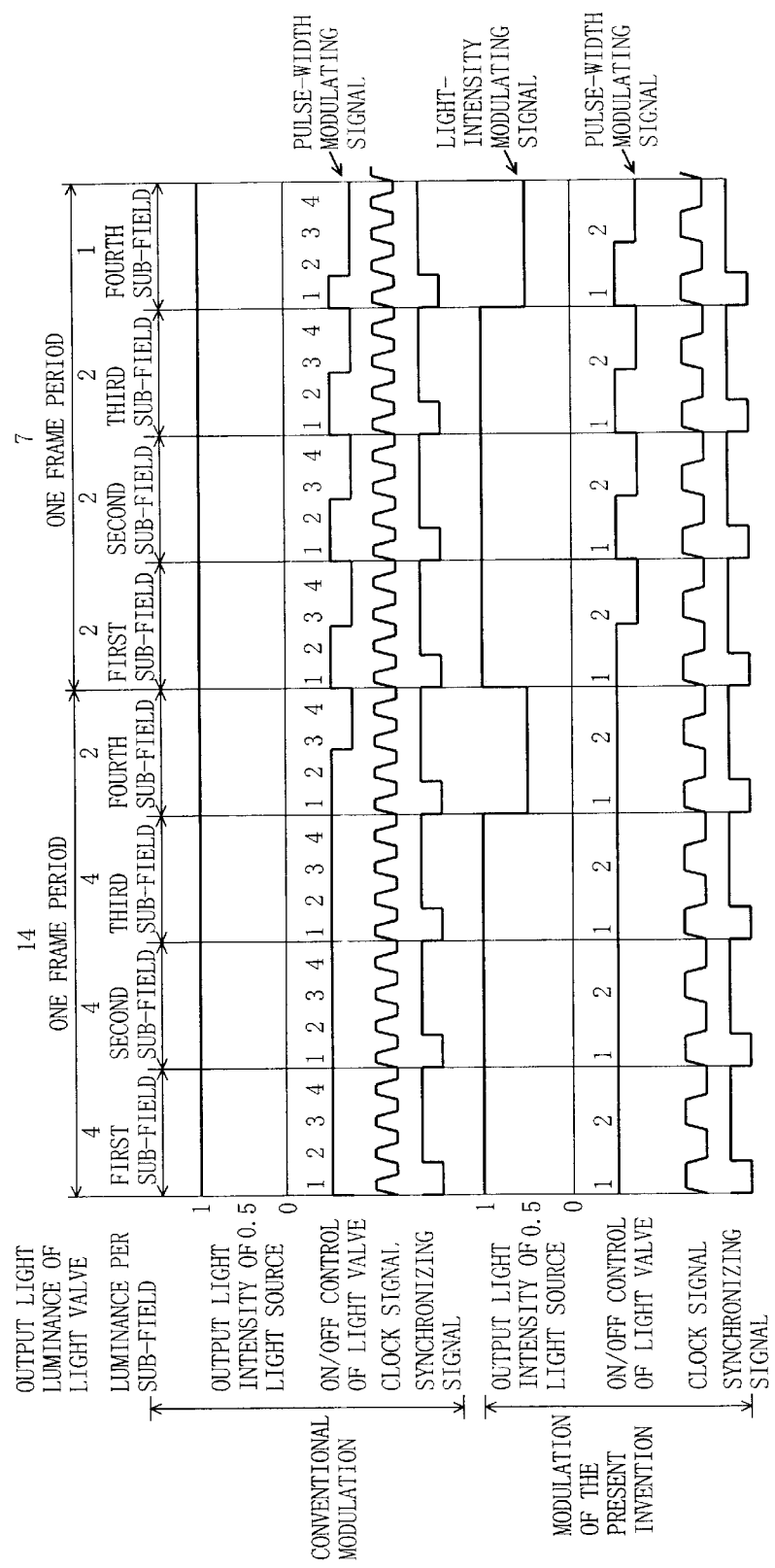
F I G. 1 9

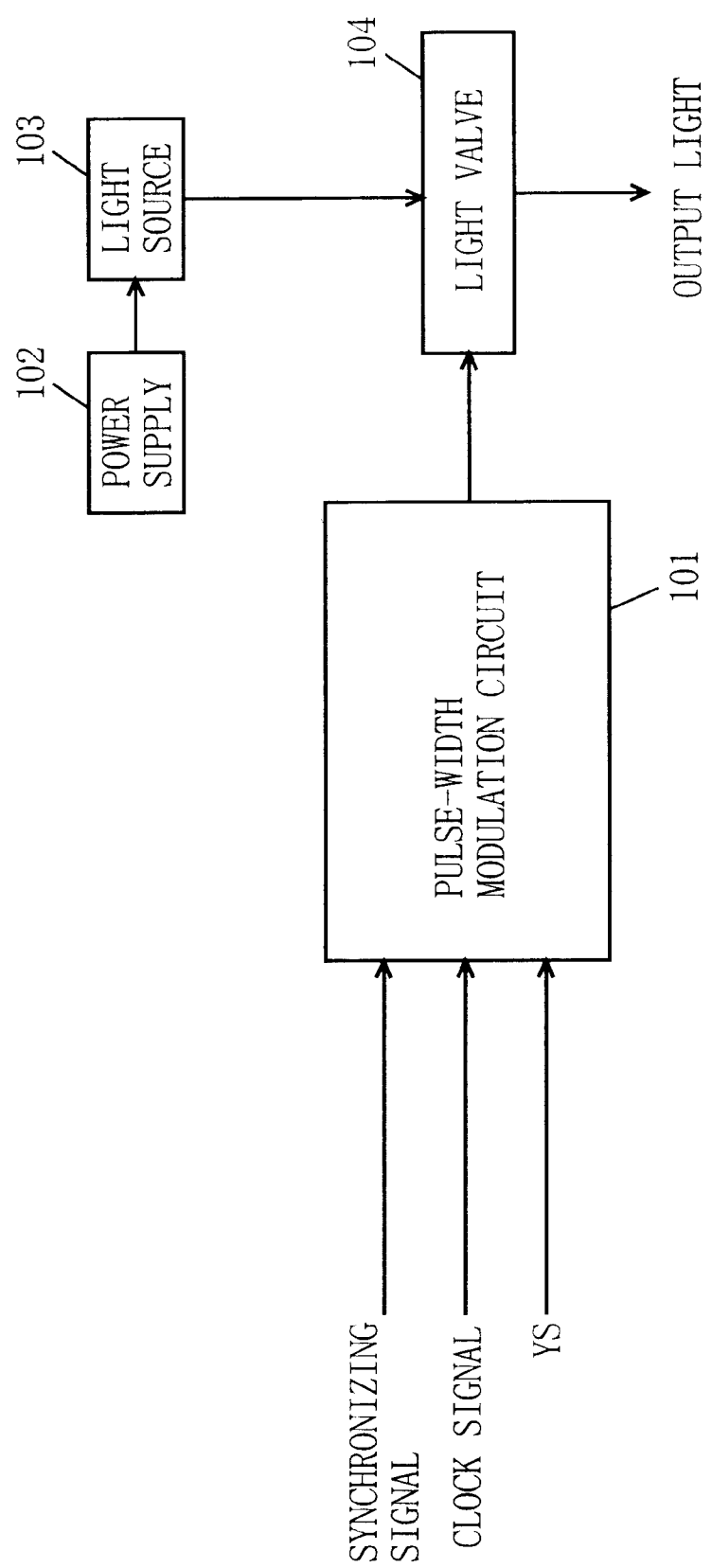
F I G. 2 0

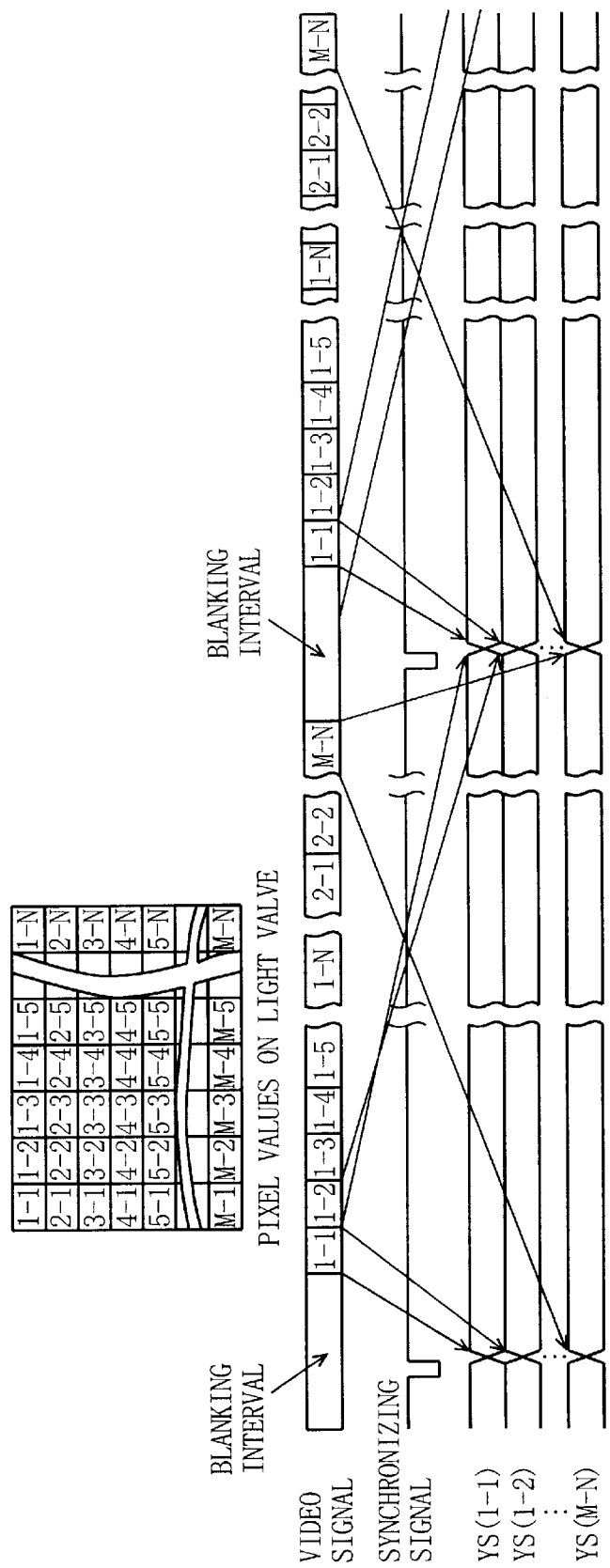

OPTICAL MODULATOR

TECHNICAL FIELD

The present invention relates to optical modulation apparatuses and, more specifically, to an optical modulation apparatus that uses a light source and a device for ON/OFF control of light outputted from the light source.

BACKGROUND ART

In one conventional optical modulation apparatus that uses a light source and a device for ON/OFF control of light outputted from the light source, by controlling the device for ON/OFF control of the output light to vary the density of ON time (typically, by carrying out pulse-width modulation or pulse-number modulation), light is outputted that has luminance according to a provided luminance signal. At this time, the apparatus is structured to operate by varying density during ON time in a unit of a clock signal (that is, to modulate the pulse width or pulse number of the output light from the light source within a unit of the clock signal).

Described below is the conventional optical modulation apparatus with reference to drawings.

FIG. 20 is a block diagram showing the structure of the conventional optical modulation apparatus. In FIG. 20, the conventional optical modulation apparatus includes a pulse-width modulation circuit 101, a power supply 102, a light source 103, and a light valve 104.

The light source 103 is supplied with electric power by the power supply 102 for outputting light. The light valve 104 receives an output pulse (pulse-width modulating signal) from the pulse-width modulation circuit 101 and the output light from the light source 103, and outputs pulse-width modulated light.

FIG. 21 is a block diagram showing one example of structure of the pulse-width modulation circuit 101 of FIG. 20. In FIG. 21, the pulse-width modulation circuit 101 includes a down counter 1011, a flip-flop circuit 1012, and a D flip-flop circuit 1013.

In FIG. 21 when the pulse-width modulation circuit 101 is supplied with a synchronizing signal, the down-counter 1011 loads a value of a signal YS indicating a luminance of a specific pixel according to the synchronizing signal. Simultaneously, the flip-flop circuit 1012 is set to "1".

The value loaded to the down-counter 1011 is down-counted in accordance with a clock signal. When the value becomes 0, the down-counter 1011 outputs a value of 0. This 0 output from the down-counter 1011 resets an output from the flip-flop circuit 1012 to "0". The D flip-flop circuit 1013 takes in the output from the flip-flop circuit 1012 according to the clock signal, and then outputs the same.

If the reset operation has higher priority than any other operation in the flip-flop circuit 1012, when YS is 0, the D flip-flop circuit 1013 does not output any pulse. On the other hand, if YS has a value other than 0, pulses spaced by a time-width in proportion to the value are outputted.

Again in FIG. 20, the pulse-width modulation circuit 101 receives the synchronizing signal, the clock signal, and the YS for carrying out the above operation, thereby outputting pulses spaced by the time-width in proportion to the value of the luminance signal YS. On the other hand, the light source 103 is supplied with electric power by the power supply 102 for outputting light having predetermined intensity. The output light of the light source 103 is supplied to the light valve 104, and ON/OFF-controlled therein with the output pulses from the pulse-width modulation circuit 101.

FIG. 22 is a diagram showing operating waveforms of the conventional optical modulation apparatus (the apparatus of FIG. 20). Shown in FIG. 22 are a waveform indicating output light intensity of the light source 103 and a waveform of the output pulses (pulse-width modulating signal) of the pulse-width modulation circuit 101.

Note that shown in FIG. 22 are the waveforms for four frame periods (from left on the drawing, a first to fourth frame periods; the same goes in the following). One frame period includes eight cycles of the clock signal (that is, one frame period is equal to eight clock periods).

The output light of the light source 103 having the intensity waveform as shown in FIG. 22 and the output pluses (pulse-width modulating signal) of the pulse-width modulation circuit 101 having the waveform as shown in FIG. 22 are supplied to the light valve 104. From the light valve 104, light having the luminance "8" at maximum is outputted. This light has the luminance "8" during the first field period, the luminance "4" during the second field period, the luminance "2" during the third field period, and the luminance "1" during the fourth field period.

The luminance described herein is a value obtained by time-integrating the output light intensity of the light source 103 over one frame period. In the example of FIG. 22, the output light intensity of the light source is constant (=1), and the luminance of the light outputted from the light valve 104 is represented by a density, per one frame period (=eight clock periods), representing the number of clock periods during which the light valve 104 is ON.

Therefore, if the light valve 104 is OFF during one frame period, the output light luminance of the light valve 104 during that frame period is "0".

Also, if the light valve 104 is ON at the density of one clock period per one frame period, the output light luminance is "1", and this is minimum luminance for the light (that is, the darkest) outputted from the light valve 104 (the fourth frame). Similarly, the output light intensity for ONs for eight clock periods is "8", and this is maximum luminance for the light (that is, the brightest) (the first frame).

In other words, the optical modulation apparatus of FIG. can output light of nine types of luminance including "0".

Note that description has been made in the foregoing for a case where the light valve 104 has only one pixel. In this case, there needs only one pulse-width modulation circuit 101. However, there exists a light valve having a plurality of pixels as shown in FIG. 23, and an optical modulation apparatus using such light valve has been made for practical use.

FIG. 23 is a diagram showing a light valve having a plurality of pixels and a relation between each pixel of the light valve and a video signal. In FIG. 23, each pixel included in the light valve is supplied with output light from a single light source.

A conventional optical modulation apparatus using the light valve of FIG. 23 includes a plurality of pulse width modulation circuits 101 corresponding to each pixel. Each of the pulse-width modulation circuit 101 is supplied with a value of a luminance signal YS corresponding to each pixel. Then, outputted through the light valve 104 is a ray bundle having a plurality of lights each having a luminance corresponding to each pixel.

As is evident from the above description, in the conventional optical modulation apparatus using the light source 103 and the device (light valve 104) for ON/OFF control of the output light of the light source, for the purpose of increasing the types of luminance (that is, the number of gradations) of light outputted from the light valve 104, it is required to increase the frequency of the clock signal which serves as a unit for ON/OFF control. In other words, the operating speed of the light valve for ON/OFF control of the output light of the light source 103 (that is, the frequency of the clock signal) disadvantageously restricts the number of gradations of the light outputted from the light valve 104.

DISCLOSURE OF THE INVENTION

Therefore, an object of the present invention is to provide an optical modulation apparatus that uses a light source and a device for ON/OFF control of an output light of the light source, the optical modulation apparatus capable of increasing the number of gradations (types of luminance) of light outputted from the device without increasing the frequency of a clock signal which serves as a unit of the ON/Off control of the output light from the light source.

To solve the above problem above, the present invention has the following aspects.

A first aspect of the present invention is directed to an optical modulation apparatus for outputting light having luminance according to a luminance signal. The first aspect comprises light-emitting means for emitting light, and ON/OFF control means for carrying out ON/OFF control of the light from the light-emitting means based on the luminance signal, a synchronizing signal, and a clock signal, and outputting the light having the luminance according to the luminance signal. When a value of the luminance signal is not less than a predetermined value, the light-emitting means emits the light having predetermined intensity, while the ON/OFF control means controls the light from the light-emitting means to become ON at a density according to the luminance signal. When the value of the luminance signal is less than the predetermined value, the ON/OFF control means controls the light from the light-emitting means to become ON at predetermined density, while the light-emitting means emits the light having intensity according to the luminance signal.

In the above first aspect, when the value of the luminance signal is not less than the predetermined value, the light having the predetermined intensity is controlled to become ON at a density (an amount) according to the luminance signal. Otherwise, the light having intensity according to the luminance signal is controlled to become ON at predetermined density (amount). Thus, light having smaller luminance can be outputted without the use of a clock signal of higher frequency (the number of luminance, that is, the number of gradations, is increased). Alternatively, with the use of a clock signal of lower frequency, light having the same luminance can be outputted.

Here, the above predetermined value is typically, as in the following second aspect, a signal value that corresponds to the luminance of light outputted when the ON/OFF control means controls the light outputted from the light-emitting means to become ON at a density of one cycle of the clock signal for one cycle of the synchronizing signal, that is, a signal value that corresponds to minimum luminance that can be generated by the ON/OFF control means that operates by a unit of one cycle of the clock signal.

Moreover, for the purpose of emitting light having intensity according to the luminance signal, as in the following third and fourth aspects, for example, electric power supplied to a light source is controlled based on the luminance signal, or, as in the following fifth and sixth aspects, light from the light source is intensity-modulated based on the luminance signal.

Furthermore, to control the light from the light-emitting means to become ON at predetermined density, pulse-width modulation is carried out as in the following third and fifth aspects, or number-of-pulses modulation is carried out as in the following fourth and sixth aspects, for example.

According to the second aspect, further to the first aspect, the predetermined value is a signal value that corresponds to luminance of the light outputted from ON/OFF control means that is obtained by controlling the light from the light-emitting means to become ON at a density of one cycle of the clock signal for one cycle of the synchronizing signal.

In accordance with the above second aspect, it is possible to output light having smaller luminance than the minimum luminance that can be outputted from the ON/OFF control means. Or, if light having the same minimum luminance is outputted, it is possible to slow the operating speed of the ON/OFF control means.

According to the third aspect, further to the second aspect, the light-emitting means includes a light source, a power supply for supplying electric power to the light source, and a light intensity modulation circuit, supplied with the luminance signal and the synchronizing signal, for generating, based on those signals, an intensity modulating signal, and outputting the intensity modulating signal to the power supply, thereby causing the light source to output light intensity-modulated according to the luminance signal. Further, the ON/OFF control means includes a light valve supplied with light from the light source, and a pulse-width modulation circuit, supplied with the luminance signal, the synchronizing signal, and the clock signal, for generating, based on those signals, a pulse-width modulating signal, and outputting the pulse-width modulating signal to the light valve, thereby causing the light valve to output light modulated in pulse width according to the luminance signal.

In the above third aspect, the intensity modulating signal is generated based on the luminance signal and synchronizing signal, and given to the power supply for supplying electric power to the light source, thereby causing the light source to output light intensity-modulated according to the luminance signal. Also, the pulse-width signal is generated based the luminance signal, the synchronizing signal, and the clock signal, and given to the light valve supplied with the light from the light source, thereby causing the light valve to output pulse-width modulated light according to the luminance signal.

According to the fourth aspect, further to the second aspect, the light-emitting means includes a light source, and a light intensity modulation circuit, supplied with the luminance signal and the synchronizing signal, for generating, based on those signal, an intensity modulating signal, and outputting the intensity modulating signal to the power supply, thereby causing the light source to output light intensity modulated according to the luminance signal. Further, the ON/OFF control means includes a light valve supplied with the light from the light source, and a pulse-number modulation circuit, supplied with the luminance signal, the synchronizing signal, and the clock signal, for generating, based on those signals, a pulse-number modulating signal, and outputting the pulse-number modulating signal to the light valve, thereby causing the light valve to output pulse-number modulated light according to the luminance signal.

In the above fourth aspect, the intensity modulating signal is generated based on the luminance signal and the synchronizing signal, and given to the power supply for supplying electric power to the light source, thereby causing the light source to output light intensity-modulated according to the luminance signal. Also, the pulse-number modulating signal is generated based on the luminance signal, the synchronizing signal, and the clock signal, and given to the light valve supplied with the light from the light source, thereby causing the light valve to output pulse-number modulated light according to the luminance signal.

According to the fifth aspect, further to the second aspect, the light-emitting means includes a light source, a power supply for supplying predetermined electric power to the light source, a light intensity modulator for intensity-modulating light outputted from the light source, and a light intensity modulator drive circuit, supplied with the luminance signal and the synchronizing signal, for generating, based on those signals, an intensity modulating signal, and outputting the intensity modulating signal to the light intensity modulator, thereby causing the light intensity modulator to output light intensity-modulated according to the luminance signal. Further, the ON/OFF control means includes a light valve supplied with the light from the light intensity modulator, and a pulse-width modulation circuit, supplied with the luminance signal, the synchronizing signal, and the clock signal, for generating, based on those signals, a pulse-width modulating signal, and outputting the pulse-width modulating signal to the light valve, thereby causing the light valve to output light modulated in pulse width according to the luminance signal.

In the above fifth aspect, the intensity modulating signal is generated based on the luminance signal and synchronizing signal, and given to the light intensity modulator for intensity-modulating the light from the light source supplied with predetermined electric power, thereby causing the light intensity modulator to output light intensity-modulated according to the luminance signal. Also, the pulse-width modulating signal is generated based on the luminance signal, the synchronizing signal, and the clock signal, and given to the light valve supplied with the light from the light source, thereby causing the light valve to output pulse-width modulated light according to the luminance signal.

According the sixth aspect, further to the second aspect, the light-emitting means includes a light source, a power supply for supplying predetermined electric power to the light source, and a light intensity modulator drive circuit, supplied with the luminance signal and the synchronizing signal, for generating, based on those signals, an intensity modulating signal, and outputting the intensity modulating signal to the light intensity modulator, thereby causing the light intensity modulator to output light intensity-modulated according to the luminance signal. Further, the pulse-width modulation means includes a light valve supplied with the light from the light intensity modulator, and a pulse-number modulation circuit, supplied with the luminance signal, the synchronizing signal, and the clock signal, for generating, based on those signals, a pulse-number modulating signal, and outputting the pulse-number modulating signal to the light valve, thereby causing the light valve to output pulse-number modulated light according to the luminance signal.

In the above sixth aspect, the intensity modulating signal is generated based on the luminance signal and the synchronizing signal, and given to the light intensity modulator for intensity-modulating the light from the light source supplied with predetermined electric power, thereby causing the light intensity modulator to output intensity-modulated according to the luminance signal. Also, the pulse-number modulating signal is generated based on the luminance signal, the synchronizing signal, and the clock signal, and given to the light valve supplied with the light from the light source, thereby causing the light valve to output pulse-number modulated light according to the luminance signal.

A seventh aspect is directed to an optical modulation apparatus for outputting light having a luminance according to a luminance signal. The apparatus according to the seventh aspect comprises light-emitting means for emitting light, and ON/OFF control means for carrying out ON/OFF control of the light from the light-emitting means based on the luminance signal for each frame period, a frame synchronizing signal, and a clock signal, and outputting light having luminance according to the luminance signal for each frame period. The light-emitting means emitting the light have each predetermined intensity for each sub-field period. Further, the ON/OFF control means, based on the luminance signal, divides one frame period into a plurality of sub-field periods based on the luminance signal for each frame period, the frame synchronizing signal, and the clock signal, divides one frame period into a plurality of sub-field periods, and generates a sub-field synchronizing signal and a luminance signal for each sub-field period. The ON/OFF control means additionally gives the generated sub-field synchronizing signal to the light-emitting means, and controls, for each sub-field period, the light from the light-emitting means to become ON at a density according to the generated luminance signal for each sub-field period.

In the above seventh aspect, the light having predetermined intensity for each sub-field period is emitted, while the luminance signal for each sub-field period is generated for controlling the light to become ON at a density according to the luminance signal. Thus, light having smaller luminance can be outputted without the use of a clock signal of higher frequency (the number of luminance, that is, the number of gradations, is increased). Alternatively, with the use of a clock signal of lower frequency, light having the same luminance can be outputted. Furthermore, output light from only a single light source can be controlled in density and intensity according to a plurality of luminance signals (corresponding to a plurality of pixels).

Here, for the purpose of emitting light having predetermined intensity for each sub-field period, as in the following eighth and ninth aspects, electric power supplied to a light source is controlled based on the luminance signal, or, as in the following tenth and eleventh aspects, light from the light source is intensity-modulated based on the luminance signal.

Furthermore, to control the light from the light-emitting means to become ON at predetermined density, pulse-width modulation is carried out as in the following eighth and tenth aspects, or pulse-number modulation is carried out as in the following ninth and eleventh aspects, for example.

According to the eighth aspect, further to the seventh aspect, the light-emitting means includes a light source, a power supply for supplying predetermined electric power to the light source, and a light intensity modulator drive circuit, supplied with the frame synchronizing signal and the sub-field synchronizing signal, for generating, based on those signals, an intensity modulating signal for each sub-field period, and outputting the intensity modulating signal to the light intensity modulator, thereby causing the light intensity modulator to output light having a predetermined intensity for each sub-field period. Further, the ON/OFF control means includes a light valve supplied with the light from the light intensity modulator, a sub-field drive circuit, supplied with the luminance signal for each the frame period, the frame synchronizing signal, and the clock signal, for generating, based on these signals, the sub-field synchronizing signal and the luminance signal for each the sub-field period, and a pulse-width modulation circuit, supplied with the sub-field synchronizing signal and the luminance signal for each sub-field period, for generating, based on these signals, a pulse-width modulating signal and outputting the pulse-width modulating signal, thereby causing the light valve to output pulse-width modulated light according to the luminance signal for each sub-field period.

In the above eighth aspect, the sub-field synchronizing signal and the luminance signal for each sub-field period are generated based on the luminance signal for each frame period, the frame synchronizing signal, and the clock signal. Then, based on the frame synchronizing signal and the sub-field synchronizing signal, the intensity modulating signal for each sub-field period is generated and outputted to the power supply, thereby causing the light source to output light having predetermined intensity for each sub-field period. On the other hand, the pulse-width modulating signal is generated based on the sub-field synchronizing signal and the luminance signal for each sub-field period, and given to the light valve, thereby causing the light valve to output pulse-width modulated light according to the luminance signal for each sub-field period.

According to the ninth aspect, further to the seventh aspect, the light-emitting means includes a light source, a power supply for supplying predetermined electric power to the light source, and a light intensity modulation circuit, supplied with the frame synchronizing signal and the sub-field synchronizing signal, for generating, based on these signals, an intensity modulating signal for each the sub-field period and outputting the intensity modulating signal to the power supply, thereby causing the light source to output light having predetermined intensity for each sub-field period. Further, the ON/OFF control means includes a light valve supplied with the light from the light source, a sub-field drive circuit, supplied with the luminance signal for each the frame period, the frame synchronizing signal, and the clock signal, for generating, based on these signals, the sub-field synchronizing signal and the luminance signal for each sub-field period, and a pulse-number modulating circuit, supplied with the sub-field synchronizing signal and the luminance signal for each the sub-field period, for generating, based on these signals, a pulse-number modulating signal and outputting the pulse-number modulating signal to the light valve, thereby causing the light valve to output pulse-number modulated light according to the luminance signal for each sub-field period.

In the above ninth aspect, the sub-field synchronizing signal and the luminance signal for each sub-field period is generated based on the luminance signal for each frame period, the frame synchronizing signal, and the clock signal. Then, the intensity modulating signal for each sub-field period is generated based on the frame synchronizing signal and the sub-field synchronizing signal, and outputted to the power supply, causing the light source to output the light having predetermined intensity for each sub-field period. On the other hand, the pulse-number modulating signal is generated based on the sub-field synchronizing signal and the luminance signal for each sub-field period, and outputted to the light valve, thereby causing the light valve to output light modulated in the number of pulses according to the luminance signal for each sub-field period.

According to the tenth aspect, further to the seventh aspect, the light-emitting means includes a light source, a power supply for supplying predetermined electric power to the light source, a light intensity modulator for intensity-modulating light outputted from the light source, and a light intensity modulator drive circuit, supplied with the frame synchronizing signal and the sub-field synchronizing signal, for generating, based on these signals, an intensity modulating signal for each sub-field period and outputting the intensity modulating signal to the light intensity modulator, thereby causing the light intensity modulator to output light having predetermined intensity for each sub-field period. Further, the ON/OFF control means includes a light valve supplied with light from the light intensity modulator, a sub-field drive circuit, supplied with the luminance signal for each the frame period, the frame synchronizing signal, and the clock signal, for generating, based on these signals, the sub-field synchronizing signal and the luminance signal for each sub-field period, and a pulse-width modulation circuit, supplied with the sub-field synchronizing signal and the luminance signal for each the sub-field period, for generating, based on these signals, a pulse-width modulating signal and outputting the pulse-width modulating signal to the light valve, thereby causing the light valve to output pulse-width modulated light according to the luminance signal for each sub-field period.

In the above tenth aspect, the sub-field synchronizing signal and the luminance signal for each sub-field period are generated based on the luminance signal for each frame period, the frame synchronizing signal, and the clock signal. Then, the intensity modulating signal for each sub-field period is generated based on the frame synchronizing signal and the sub-field synchronizing signal, and is outputted to the light intensity modulator, thereby causing the light intensity modulator to output light having predetermined intensity for each sub-field period. On the other hand, the pulse-width modulating signal is generated based on the sub-field synchronizing signal and the luminance signal for each sub-field period, and is outputted to the light valve, thereby causing the light valve to output pulse-number modulated light according to the luminance signal for each sub-field period.

According to the eleventh aspect, further to the seventh aspect, the light-emitting means includes a light source, a power supply for supplying predetermined electric power to the light source, a light intensity modulator for intensity-modulating light outputted from the light source, and a light intensity modulator drive circuit, supplied with the frame synchronizing signal and the sub-field synchronizing signal, for generating, based on these signals, an intensity modulating signal for each sub-field period and outputting the intensity modulating signal to the light intensity modulator, thereby causing the light intensity modulator to output light having predetermined intensity for each sub-field period. Further, the ON/OFF control means includes a light valve supplied with light from the light intensity modulator, a sub-field drive circuit, supplied with the luminance signal for each the frame period, the frame synchronizing signal, and the clock signal, for generating, based on these signals, the sub-field synchronizing signals and the luminance signal for each the sub-field period, and a pulse-number modulation circuit, supplied with the sub-field synchronizing signal and the luminance signal for each the sub-field period, for generating, based on these signals, a pulse-number modulating signal and outputting the pulse-number modulating signal to the light valve, thereby causing the light valve to output pulse-number modulated light according to the luminance signal for each sub-field period.

In the above eleventh aspect, the sub-field synchronizing signal and the luminance signal for each sub-field period are generated based on the luminance signal for each frame period, the frame synchronizing signal, and the clock signal. Then, the intensity modulating signal for each sub-field period is generated based on the frame synchronizing signal and the sub-field synchronizing signal, and outputted to the light intensity modulator, thereby the light intensity modulator outputs light having predetermined intensity for each sub-field period. On the other hand, the pulse-number modulating signal is generated based on the sub-field synchronizing signal and the luminance signal for each sub-field period, and is outputted to the light valve, thereby causing the light valve to output pulse-number modulated light according to the luminance signal for each sub-field period.

BRIEF DESCRIPTION OF THE DRAWINGS

FIG. 19 is a diagram showing another example of a combination of luminance values of light outputted, for each sub-field period, by the optical modulation apparatus according to the fifth to eighth embodiments of the present invention.

FIG. 20 is a block diagram showing the structure of a conventional optical modulation apparatus.

FIG. 23 is a diagram demonstrating a light valve having a plurality of pixels and a relation between each pixel and a video signal in the light valve.

BEST MODE FOR CARRYING OUT THE INVENTION

With reference to the drawings, described below are embodiments of the present invention.

First Embodiment

Figure 1:
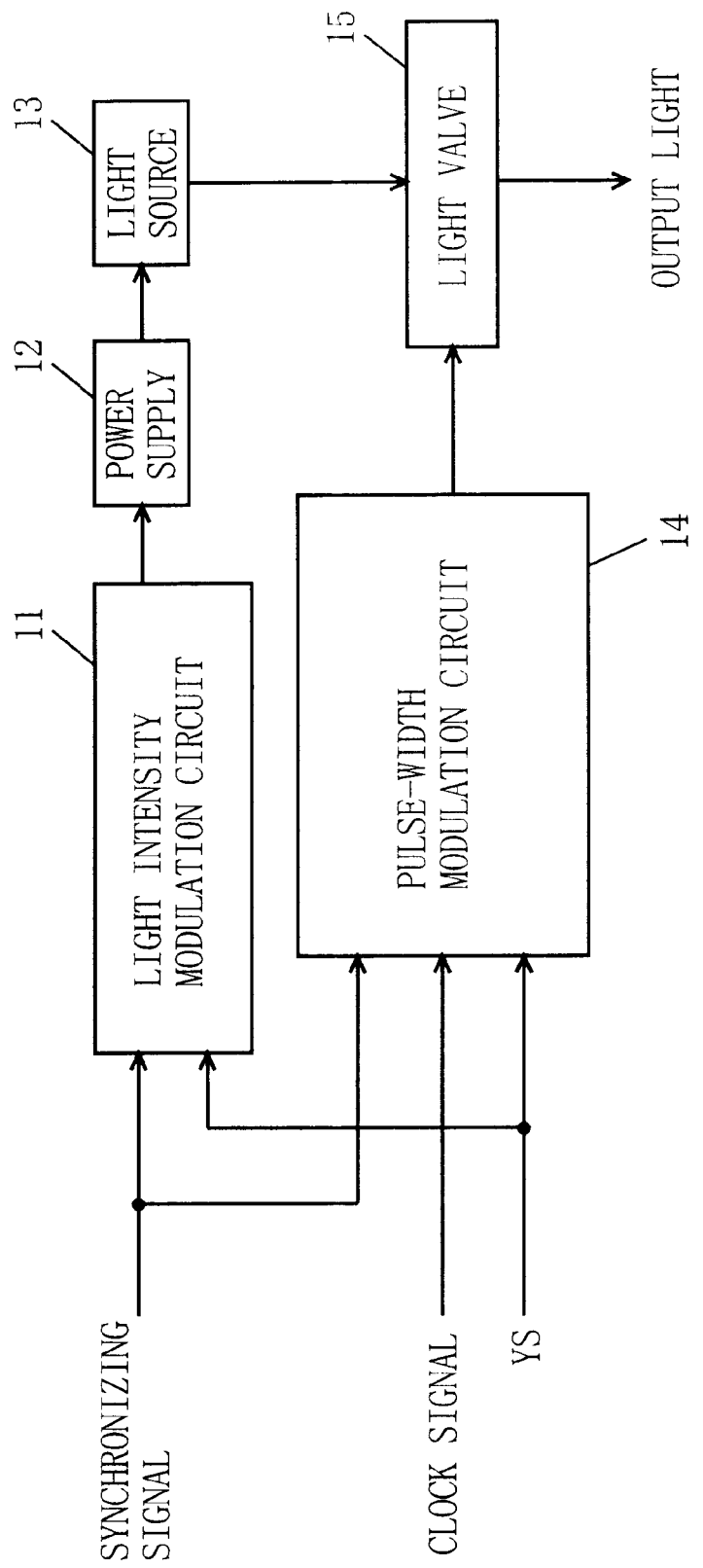
FIG. 1 is a block diagram showing the structure of an optical modulation apparatus according to a first embodiment of the present invention.

FIG. 1 is a block diagram showing the structure of an optical modulation apparatus according to a first embodiment of the present invention. In FIG. 1, the optical modulation apparatus includes a light intensity modulation circuit 11, a power supply 12, a light source 13, a pulse-width modulation circuit 14, and a light valve 15. The light valve 15 has only one pixel.

Figure 2:
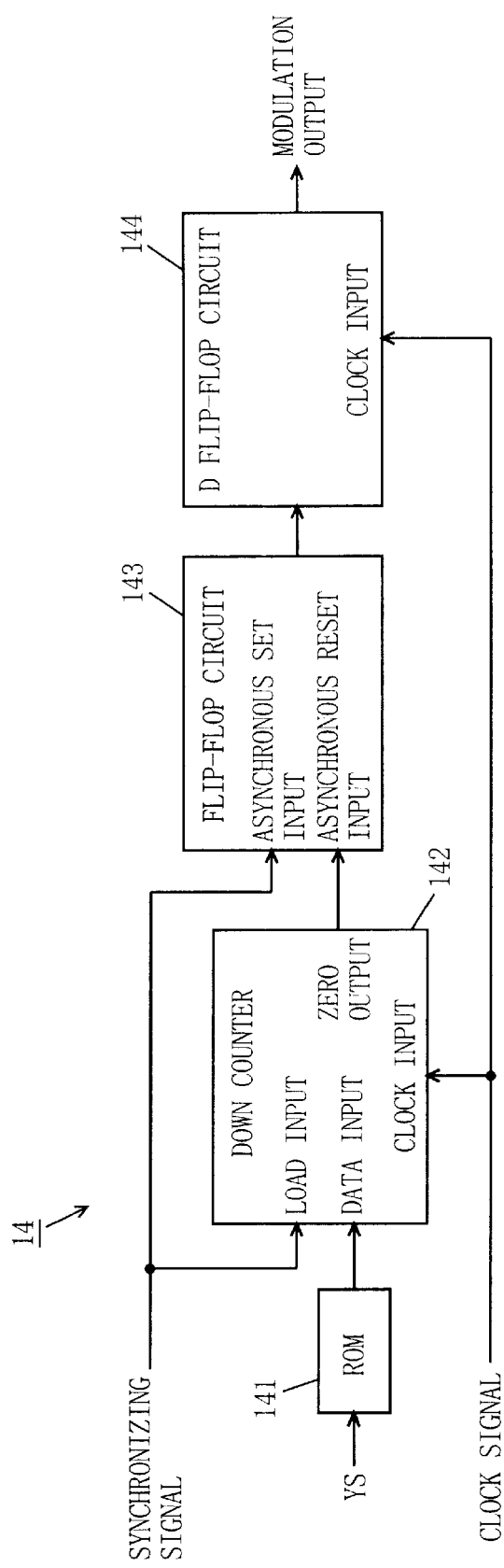
FIG. 2 is a block diagram showing one example of structure of a pulse-width modulation circuit 14 of FIG. 1.

FIG. 2 is a block diagram showing one example of structure of the pulse-width modulation circuit 14 of FIG. 1. In FIG. 2, the pulse-width modulation circuit 14 includes ROM 141, a down-counter 142, a flip-flop circuit 143, and D flip-flop circuit 144.

Figures 3, 4, 5:
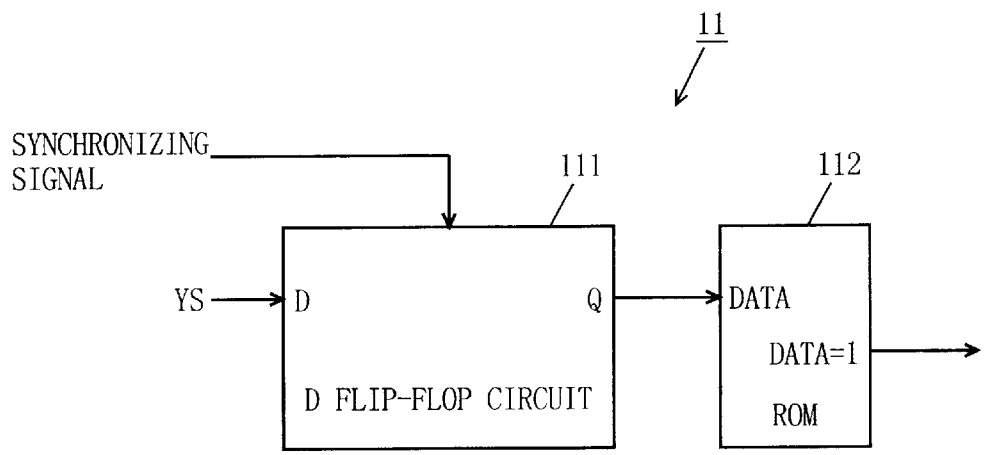
FIG. 3 is a block diagram showing one example of structure of a light intensity modulation circuit 11 of FIG. 1.
FIG. 4 is a diagram showing one example of a table stored in ROM 141 of FIG. 2.
FIG. 5 is a diagram showing one example of a table stored in ROM 112 of FIG. 3.

FIG. 3 is a block diagram showing one example of structure of the light intensity modulation circuit 11 of FIG. 1. In FIG. 3, the light intensity modulation circuit 11 includes a D flip-flop circuit 11 and ROM 112.

Described below is the operation of the optical modulation apparatus as structured above.

In FIG. 1, the optical modulation apparatus is provided to a video display apparatus (not shown), and supplied by the video display apparatus with a luminance signal YS, a synchronizing signal, and a clock signal. The luminance signal YS is given to the light intensity modulation circuit 11 and the pulse-width modulation circuit 14. The synchronizing signal is given to the light intensity modulation circuit 11 and the pulse-width modulation circuit 14. The clock signal is given to the pulse-width modulation circuit 14.

In FIG. 2, in the pulse-width modulation circuit 14, the luminance signal YS is converted in value through a table stored in the ROM 141. In the table, YS values before and after conversion are stored. One example of the table stored in the ROM 141 is shown in FIG. 4. In the example of FIG. 4, the YS values are converted from {8, 4, 2, 1} into {4, 2, 1, 1}.

When the pulse-width modulation circuit 14 is supplied with the synchronizing signal, the down-counter 142 loads an output value of the ROM 141 according to the synchronizing signal. Simultaneously, the flip-flop circuit 143 is set to "1". The value loaded into the down-counter 142 is down-counted according to the clock signal. When the value becomes 0, a 0 value is outputted from the down-counter 142. This 0 output resets an output of the flip-flop circuit 143 to "0".

The D flip-flop circuit 144 takes in the output of the flip-flop circuit 143 according to the clock signal, and outputs the same. If the reset operation has higher priority than any other operation in the flip-flop circuit 143, when the output of the ROM 141 is 0, the D flip-flip circuit 144 does not output any pulse. On the other hand, when the output of the ROM 141 takes another value other than 0, pulses spaced by a time-width in proportion to that value is outputted.

In FIG. 3, in the light intensity modulation circuit 11, the D flip-flop circuit 111 takes in the value of the luminance signal YS based on the synchronizing signal, and outputs the same. In the ROM 112, a table as shown in FIG. 5 is stored. From the ROM 112, data corresponding to the output of the D flip-flop circuit 111 is read and outputted. In FIG. 5, the output data "0" represents that the output light intensity of the light source is decreased by half.

Again in FIG. 1, in the pulse-width modulation circuit 14, the values of the luminance signal YS are converted by such operation as described above from {8, 4, 2, 1} to {4, 2, 1, 1} (refer to the table of FIG. 4). From the pulse-width modulation circuit 14, pulses spaced by a time-width in proportion to the value after conversion (pulse-width modulating signal) are outputted.

On the other hand, only if YS does not satisfy "2", the light intensity modulation circuit 11 generates a control signal for decreasing by half the intensity of the output light of the light source 13 (light intensity modulating signal). This signal is supplied to the power supply 12. The power supply 12 receives the signal from the light intensity modulation circuit 11 to modulate the output power (that is, decrease the output power by half only if YS does not satisfy "2").

The output power of the power supply 12 is supplied to the light source 13. From the light source 13, outputted is, as shown in FIG. 6, light intensity-modulated according to the luminance signal YS, specifically, light having the intensity "1" when YS is 2 or more and 0.5 when YS is less than 2.

The intensity-modulated light outputted from the light source 13 is supplied, together with the output pulses of the pulse-width modulation circuit 14, to the light valve 15. The light valve 15 subjects the input light to ON/OFF control (that is, pulse-width modulation) according to the output pulses of the pulse-width modulation circuit 14 (refer to FIG. 6). Thus, from the light valve 15, the light modulated in pulse width and intensity is outputted.

Figure 6:
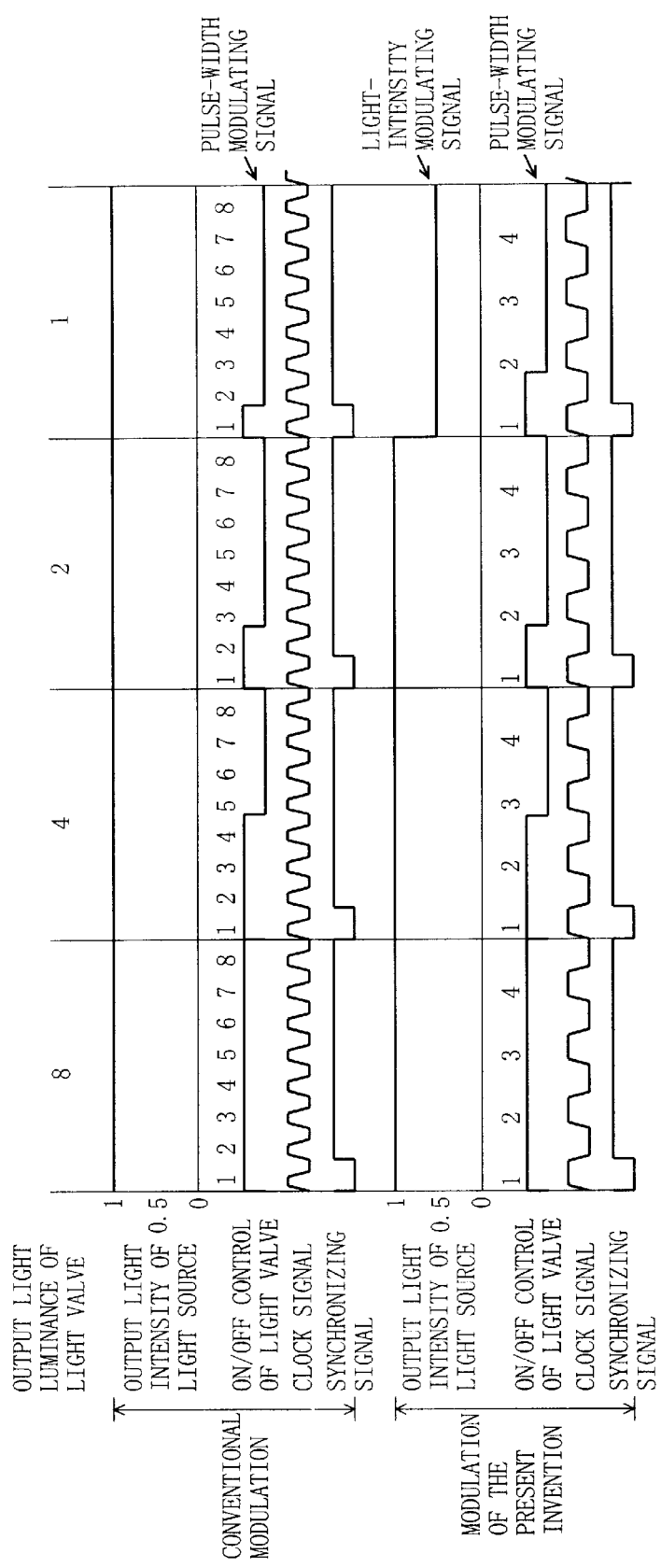
FIG. 6 is a diagram showing one example of operating waveforms of the optical modulation apparatus according to the first embodiment of the present invention (for comparison, operating waveforms of a conventional optical modulation apparatus are also shown; the same goes for FIGS. 7, 8, and 11).
Figure 22:
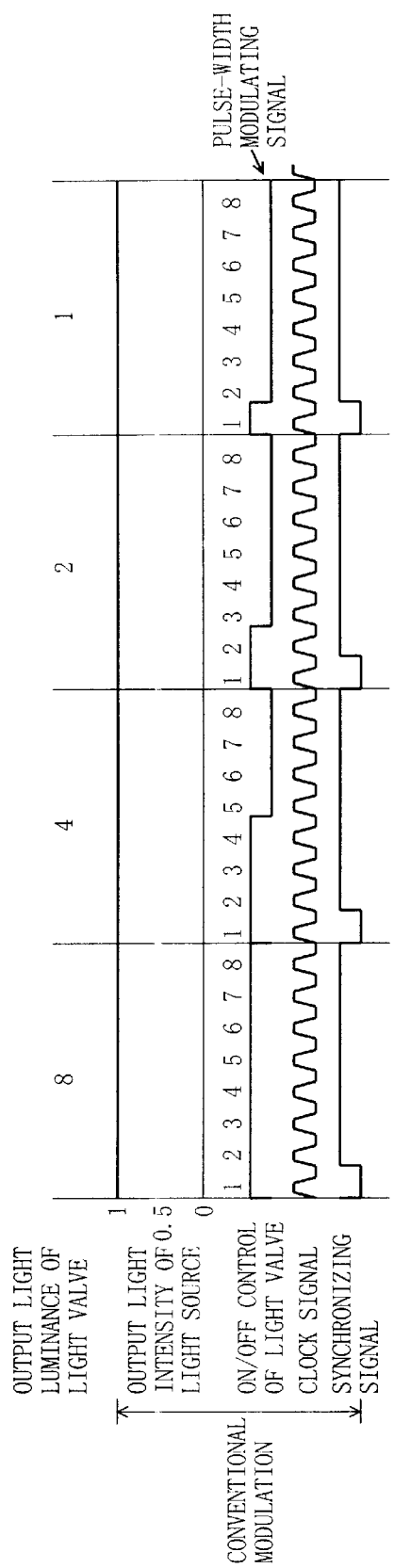
FIG. 22 is a diagram showing operating waveforms of the conventional optical modulation apparatus (the apparatus of FIG. 20).

FIG. 6 is a diagram showing one example of operating waveforms of the present optical modulation apparatus. In FIG. 6, the operating waveform of the conventional optical modulation apparatus is Also shown for comparison (the same as that of FIG. 22; refer to the description in Background Art section). Shown are the waveforms for four frame periods (from left on the drawing, the first to fourth frame periods; the same goes for in the following).

In FIG. 6, for the conventional optical modulation apparatus, eight clock signals are included in one frame period (that is, one frame period is equal to eight clock periods). On the other hand, for the present optical modulation apparatus, the frequency of the clock signal is half of that for the conventional apparatus, and four clock signals are included in one frame period (that is, one frame period is equal to four clock periods).

In the present optical modulation apparatus, the output light having the waveform as shown in FIG. 6 outputted from the light source 13 and the output pulses (pulse-width modulating signal) having the waveform as shown in FIG. 6 outputted from the pulse-width modulation circuit 14 are supplied to the light valve 15. The light valve 15 outputs light having the luminance "8" at maximum, the light having the luminance "8" during the first frame period; the luminance "4" during the second frame period; the luminance "2" during the third frame period; and the luminance "1" during the fourth frame period.

In other words, the present optical modulation apparatus can achieve the same number of gradations as that in the conventional apparatus, even though the frequency of the clock signal for ON/Off control of the output light of the light source 13 is half of that for the conventional apparatus. Therefore, if the frequency of the clock signal is equal to that of the conventional apparatus, the number of gradations can be made twice as many as that of the conventional apparatus.

Figure 7:
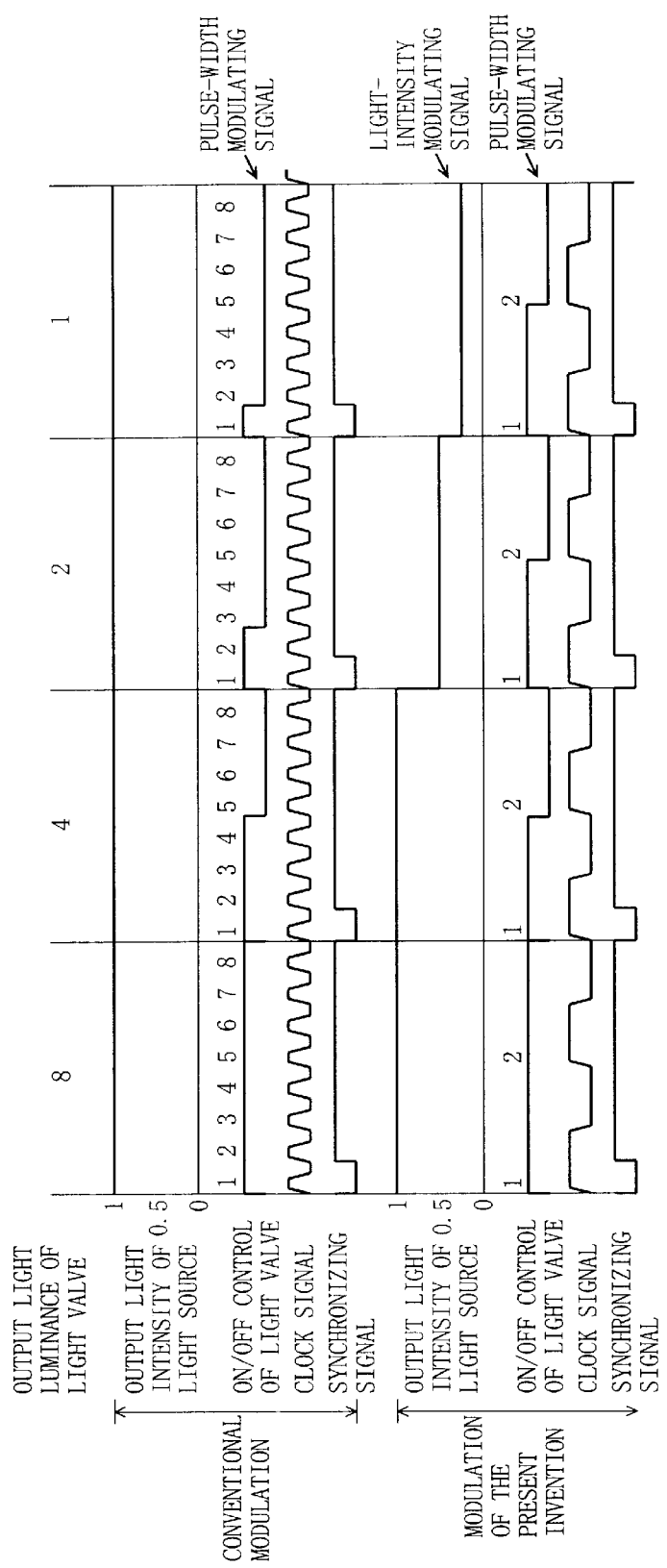
FIG. 7 is a diagram showing another example of the operating waveforms of the optical modulation apparatus according to the first embodiment of the present invention.

FIG. 7 is a diagram showing another example of operating waveforms of the present optical modulation apparatus. In FIG. 7, the operating waveform of the conventional optical modulation apparatus is also shown for comparison. Shown are the waveforms for four frame periods.

In FIG. 7, for the present light modulation apparatus, the frequency of the clock signal is one-fourth of that for the conventional apparatus, and two clock signals are included in one frame period (that is, one frame period is equal to two clock periods).

In the present optical modulation apparatus: the output light having the waveform as shown in FIG. 7 outputted from the light source 13 and the output pulses (pulse-width modulating signal) having the waveform as shown in FIG. 7 outputted from the pulse-width modulation circuit 14 are supplied to the light valve 15. The light valve 15 outputs light having the luminance "8" at maximum, the light having the luminance "8" during the first frame period; the luminance "4" during the second frame period; the luminance "2" during the third frame period; and the luminance "1" during the fourth frame period.

In other words, the present optical modulation apparatus can achieve the same number of gradations as that in the conventional apparatus, even though the frequency of the clock signal for ON/Off control of the output light of the light source 13 is one-fourth of that for the conventional apparatus. Therefore, if the frequency of the clock signal is equal to that of the conventional apparatus, the number of gradations can be made four times as large as that of the conventional apparatus.

More generally, the optical modulation apparatus can achieve the same number of gradations as that for the conventional apparatus, even though the frequency of the clock signal is one-Nth (where N is an arbitrary integer that is 2 or more; the same goes for the following) of that for the conventional apparatus. Therefore, if the frequency of the clock signal is equal to that for the conventional apparatus, the number of gradations can be made N times as many as that for the conventional apparatus.

Figure 8:
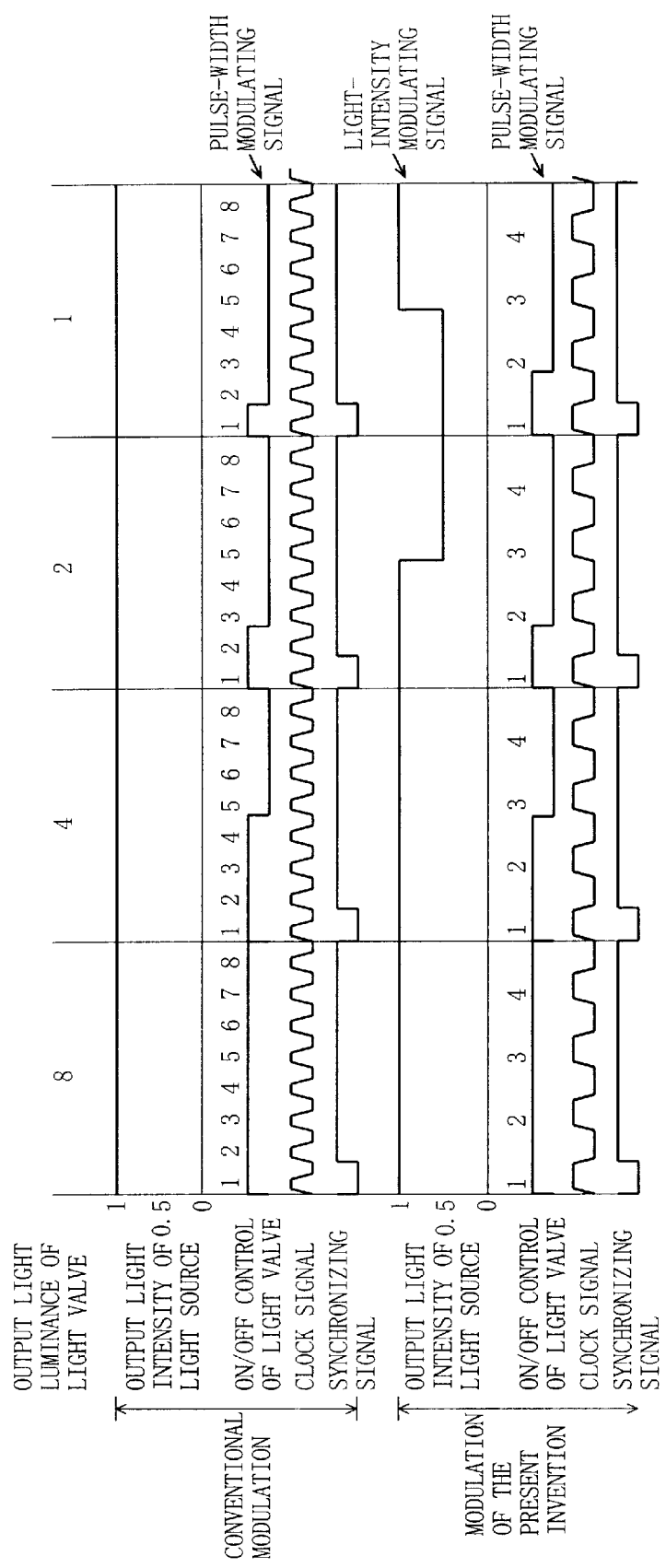
FIG. 8 is a diagram showing still another example of the operating waveforms of the optical modulation apparatus according to the first embodiment of the present inventions

FIG. 8 is a diagram showing still another, example of operating waveforms of the present optical modulation apparatus. In FIG. 8, the operating waveform of the conventional optical modulation apparatus is also shown for comparison. Shown are the waveforms for four frame periods.

In FIG. 8, for the present optical modulation apparatus, the frequency of the clock signal is half of that for the conventional apparatus, and four clock signals are included in one frame period (that is, one frame period is equal to four clock periods).

Figure 12:
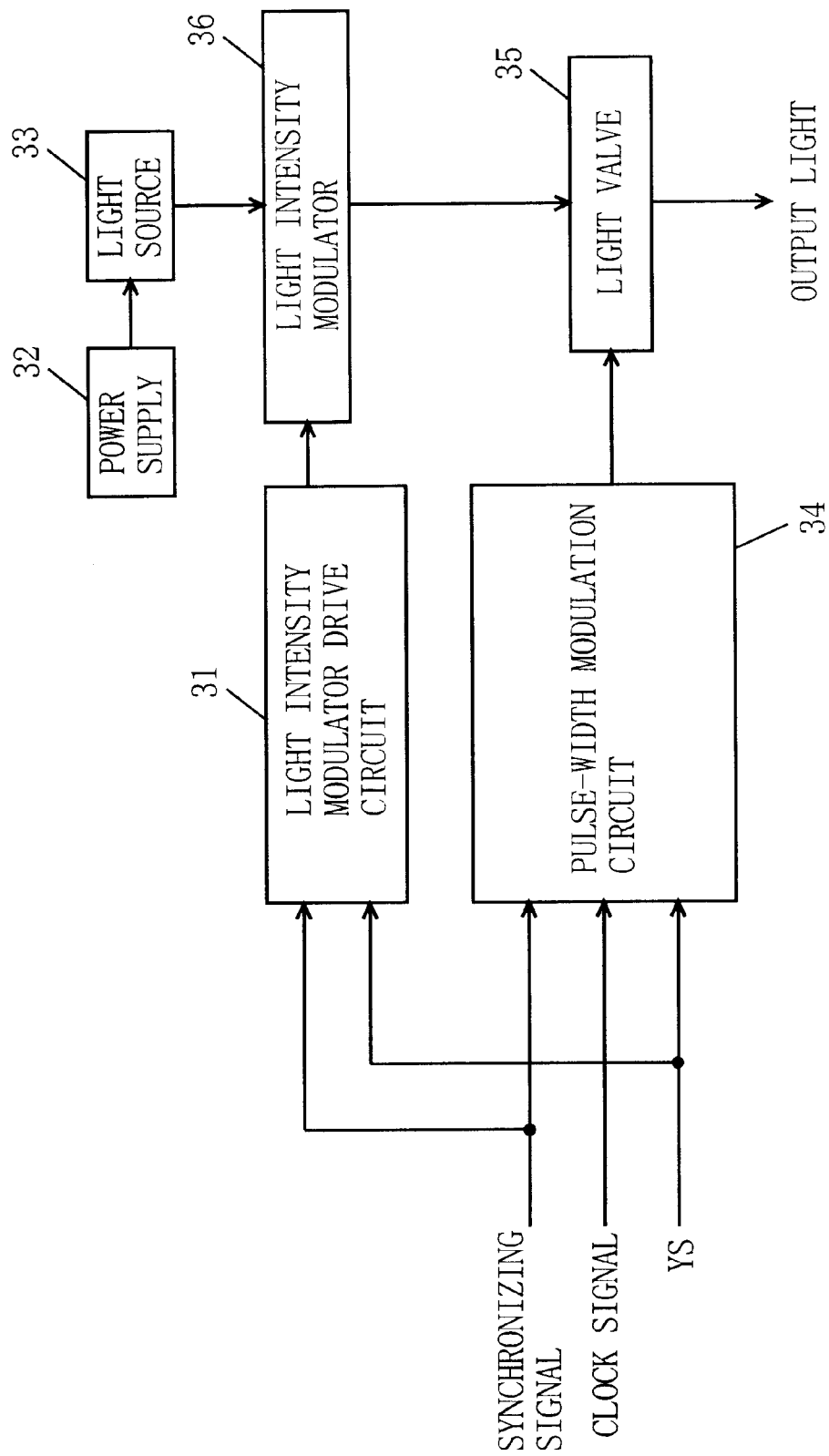
FIG. 12 is a block diagram showing the structure of an optical modulation apparatus according to a third embodiment of the present invention.

In the present optical modulation apparatus, the output light having the waveform as shown in FIG. 8 (the waveform changes a half frame period earlier than the waveform of FIG. 12) outputted from the light source 13 and the output pulses (pulse-width modulating signal) having the waveform as shown in FIG. 8 outputted from the pulse-width modulation circuit 14 are supplied to the light valve 15. The light valve 15 outputs light having the luminance "8" at maximum, the light having the luminance "8" during the first frame period; the luminance "4" during the second frame period; the luminance "2" during the third frame period; and the luminance "1" during the fourth frame period.

In other words, FIG. 8 is different from FIG. 6 in change timing where the output light intensity of the light source 13 is changed from "1" to "0.5" a half frame period earlier. Even if the output light intensity of the light source 13 is changed in such timing, the output light intensity of the light source 13 is "0. 5" when the light valve is ON during the four frame period, which is similar to the case of FIG. 6. Therefore, the same number of gradations as that of the conventional apparatus can be achieved even though the frequency of the clock signal is half of that of the conventional apparatus.

Furthermore, as shown in FIG. 8, if the output light intensity of the light source 13 is changed from "1" to "0.5" in timing different from the timing in which the light valve 15 is ON, the luminance of the light outputted from the light valve 15 becomes more stable than the case as shown in FIG. 6 where a change is made in the same timing. The reason for this is as follows. It takes predetermined time for the output light intensity of the light source 13 to change from "1" to "0.5". Therefore, when the light output intensity of the light source 13 is changed in the same timing in which the light valve 15 is ON, the luminance of light outputted from the light valve 15 may possibly be fluctuated instantaneously. As shown in FIG. 8, if the output light intensity of the light source 13 is changed when the light valve 15 is OFF, such luminance fluctuation may not occur.

As stated above, according to the present embodiment, through the light valve 15, the light from the light source 13 is ON/OFF-controlled (pulse-width modulated), and also the electric power supplied to the light source 13 is controlled, thereby also modulating the output light intensity of the light source 13. Therefore, the optical modulation apparatus is so achieved as to be able to increase the number of gradations of the light outputted from the light valve 15 without increasing the frequency of the clock signal which serves as a unit for ON/OFF control.

Note that, in the present embodiment, if such a control signal is generated as to cause the light intensity modulation circuit 11 to set the output power of the power supply 12 to "0" when the luminance signal YS is "0", a dynamic range of the light outputted from the light valve 15 can be extended. The reason for this is as follows. With (even slightest) light being supplied from the light source 13, the light valve 15 outputs light of a slight difference from exactly "0", even if the light valve 15 is OFF. If the light source 13 is turned off, however, the output of the light valve 15 so becomes exactly "0". Therefore, the dynamic range is extended by that difference.

Second Embodiment

Figure 9:
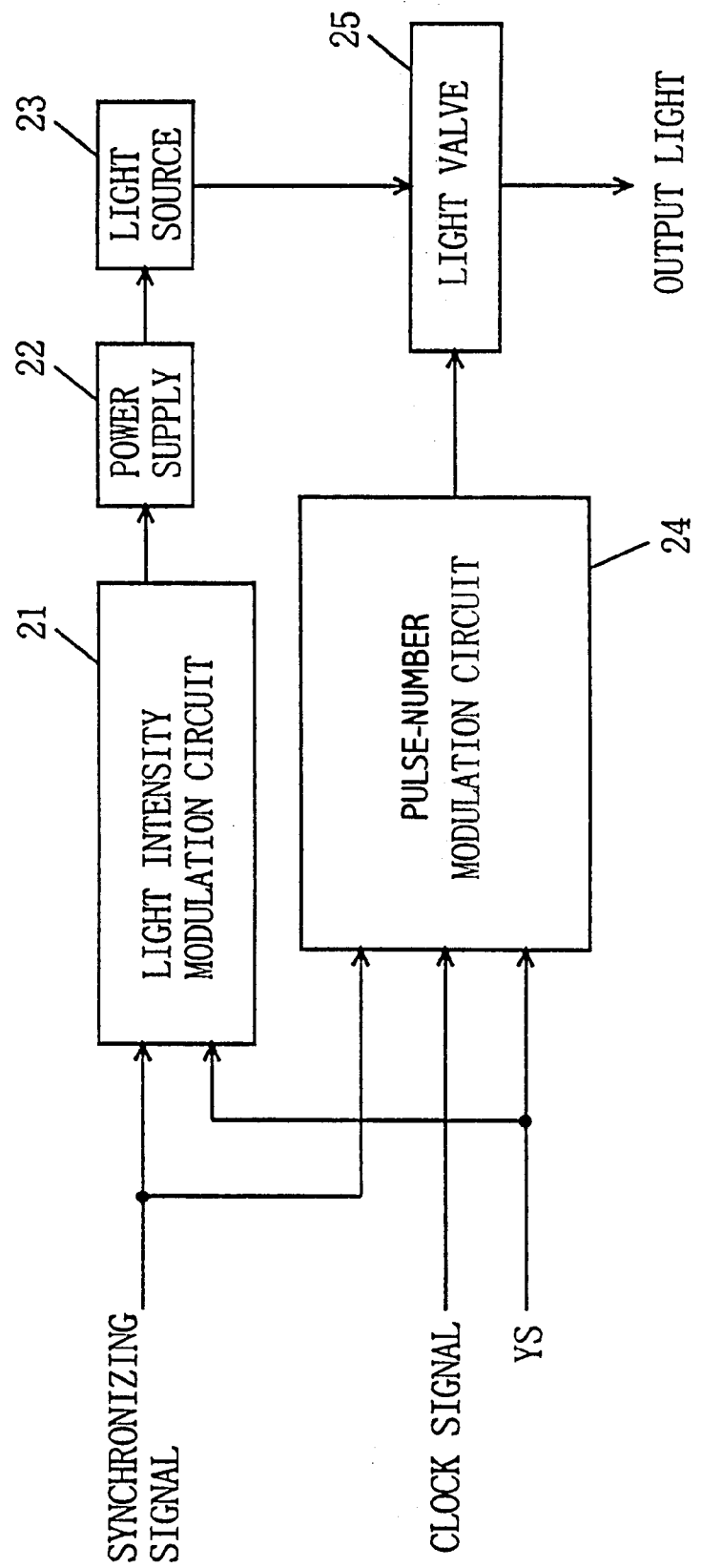
FIG. 9 is a block diagram showing the structure of an optical modulation apparatus according to a second embodiment of the present invention.

FIG. 9 is a block diagram showing the structure of an optical modulation apparatus according to a second embodiment of the present invention. In FIG. 9, the present optical modulation apparatus includes a light intensity modulation circuit 21, a power supply 22, a light source 23, a pulse-number modulation circuit 24, and a light valve 25. The light intensity modulation circuit 21, the power supply 22, the light source 23, and the light valve 25 are equivalent to the light intensity modulation circuit 11, the power supply 12, the light source 13, and the light valve 15 in FIG. 1, respectively, and operate similarly.

In other words, in the present light modulation apparatus, the pulse-number modulation circuit is provided instead of the pulse-width modulation circuit 14 of the light modulation apparatus according to the first embodiment (refer to FIG. 1).

The pulse-number modulation circuit 24 is supplied with a luminance signal YS, a synchronizing signal and a clock signal, and generates, based on these signals, a pulse-number modulating signal (will be described later) for output to the light valve 25, thereby causing the light valve 25 to output pulse-number modulated light according to the luminance signal YS.

Figure 10:
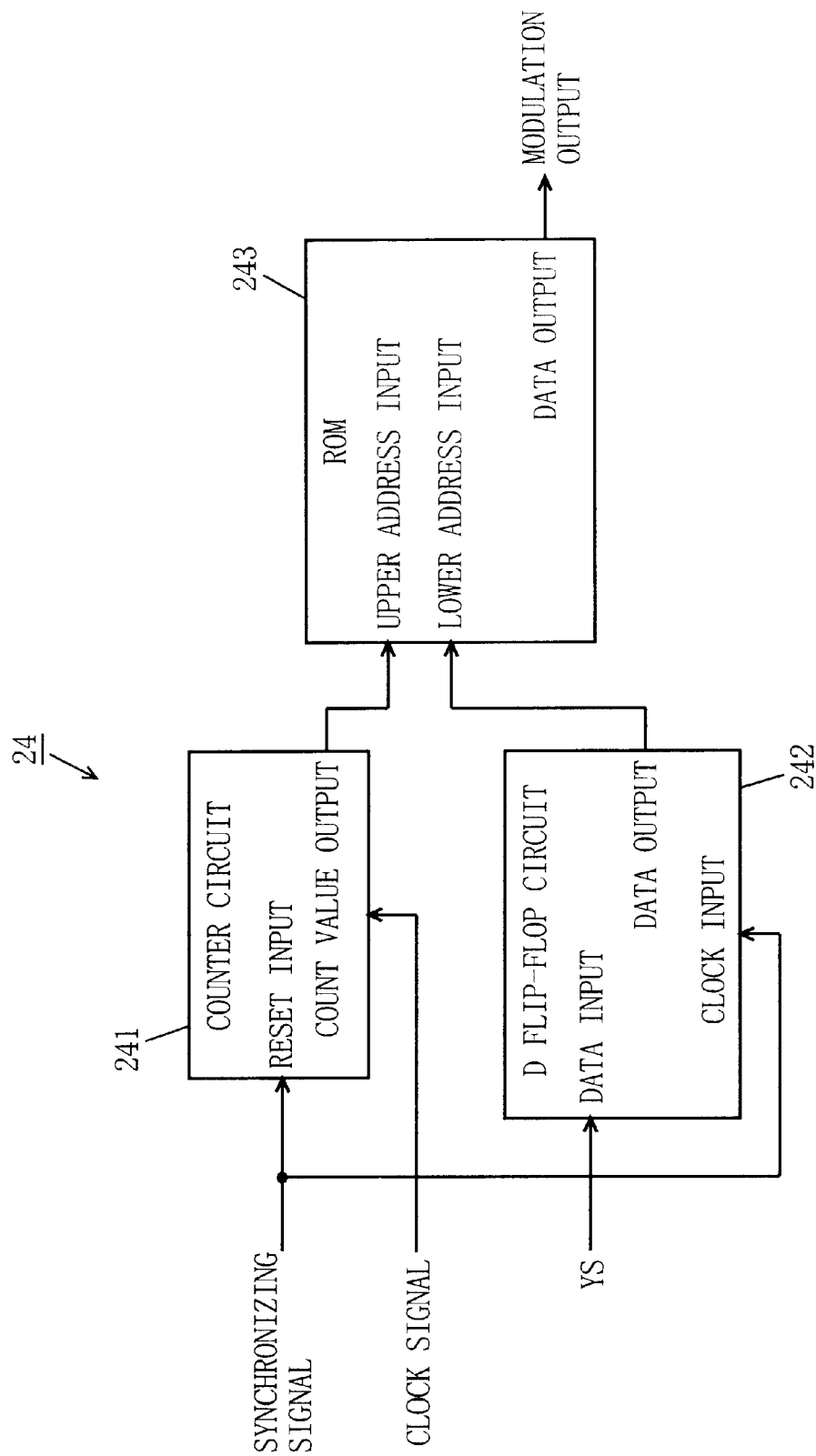
FIG. 10 is a diagram showing one example of structure of a pulse-number modulation circuit 24 of FIG. 9.

FIG. 10 is a block diagram showing one example of structure of the pulse-number modulation circuit 24 of FIG. 9. In FIG. 10, the pulse-number modulation circuit 24 includes a counter circuit 241, a D flip-flop circuit 242, and ROM 243.

In FIG. 10, when the synchronizing signal is supplied to the pulse-number modulation circuit 24, the counter circuit 241 is reset to "0". Simultaneously, the luminance signal YS is taken in by the D flip-flop circuit 242.

In the ROM 243, a table describing a correspondence between input addresses and output data is stored (not shown). The ROM 243 outputs data corresponding to the pulse-number modulating signal of FIG. 11, according to an upper address input from the counter circuit 241 and a lower address input from the D flip-flop circuit 242. Thus, the pulse-number modulation circuit 24 is so achieved as to pulse-number modulate light based on the value of YS.

Figure 11:
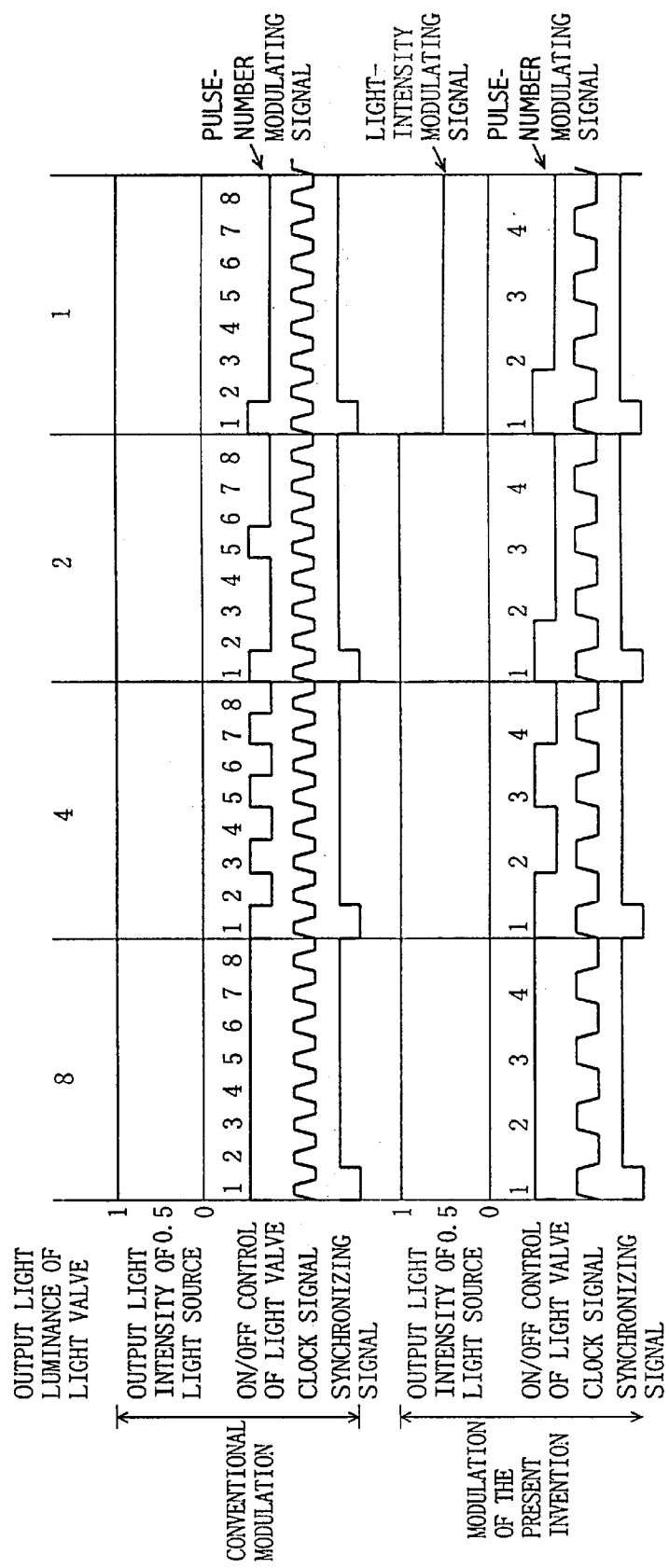
FIG. 11 is a diagram showing one example of operating waveforms of the optical modulation apparatus according to the second embodiment of the present invention.

FIG. 11 is a diagram showing one example of operating waveforms of the present optical modulation apparatus. In FIG. 11, the operating waveform of the conventional optical modulation apparatus is also shown for comparison. Shown are the waveforms for four frame periods.

In FIG. 11, in the present optical modulation apparatus, the frequency of the clock signal is one-half of that of the conventional apparatus, and four clock signals are included in one frame period (that is, one frame period is equal to four clock periods).

In the present optical modulation apparatus, output light having the waveform as shown in FIG. 11 outputted from the light source 23 and output pulses (pulse-number modulating signal) having the waveform shown in FIG. 11 outputted from the pulse-number modulation circuit 24 are supplied to the light valve 25. The light valve 25 outputs light having the luminance "8" at maximum, the light having the luminance "8" during the first frame period; the luminance "4" during the second frame period; the luminance "2" during the third frame period; and the luminance "1" during the fourth frame period.

In other words, FIG. 11 is different from FIG. 6 in that the pulses given to the light valve 25 for ON/OFF control compose not a pulse-width modulating signal but a pulse-number modulating signal. As is the case where a pulse-width modulating signal is used (the first embodiment), with the use of a pulse-number modulating signal, light from the light source 23 can also be controlled to become ON at a density according to the luminance signal YS.

According to the present embodiment, as with the first embodiment, the light modulation apparatus is so achieved as to be able to increase the number of gradations of the light outputted from the light valve 25 without increasing the frequency of the clock signal which serves as a unit for ON/OFF control.

Third Embodiment

FIG. 12 is a block diagram showing an optical modulation apparatus according to a third embodiment of the present invention. In FIG. 12, the present optical modulation apparatus includes a light intensity modulator drive circuit 31, a power supply 32, a light source 33, a pulse-width modulation circuit 34, a light valve 35, and a light intensity modulator 36.

The pulse-width modulation circuit 34 and the light valve 35 are equivalent to the pulse-width modulation circuit 14 and the light valve 15 in FIG. 1, respectively, and operate similarly. The power supply 32 supplies predetermined electric power to the light source 33. Therefore, the intensity of light outputted from the light source 33 takes a constant value.

The light intensity modulator 36 intensity-modulates the light outputted from the light source 33. The light intensity modulator drive circuit 31 receives a luminance signal YS and a synchronizing signal, and generates, based on these signals, a light-intensity modulating signal (will be described later) for output to the light intensity modulator 36, thereby causing the light intensity modulator 36 to output light intensity-modulated according to the luminance signal YS.

Described below is the operation of the above structured optical modulation apparatus.

In FIG. 12, the present optical modulation apparatus is provided to a video display apparatus (not shown), and supplied by the video display device are the luminance signal YS, the synchronizing signal (here, frame synchronizing signal), and a clock signal. The luminance signal YS is given to the light intensity modulator drive circuit 31 and the pulse-width modulation circuit 34. The synchronizing signal is given to the light intensity modulator drive circuit 31 and the pulse-width modulation circuit 34. The clock signal is given to the pulse-width modulation circuit 34.

The light intensity modulator drive circuit 31 carries out an operation similar to that of the light intensity modulation circuit 11 of FIG. 1 to generate the light intensity modulating signal as shown in FIG. 6, and outputs the same to the light intensity modulator 36. In response, the light intensity modulator 36 decreases the output light intensity of the light source 33 by half only when the luminance signal YS does not satisfy "1".

The pulse-width modulation circuit 34 carries out an operation similar to that of the pulse-width modulation circuit 14 to generate the pulse-width modulating signal as shown in FIG. 6.

Intensity-modulated light outputted from the light intensity modulator 36 is supplied, together with output pulses (pulse-width modulating signal), to the light valve 35. The light valve 35 carries out ON/OFF control (that is, pulse-width modulation) of the light according to the output pulses (refer to FIG. 6). Thus, from the light valve 35, light modulated in pulse width and intensity is outputted.

In the first embodiment, the electric power supplied to the light source 13 is controlled based on the luminance signal YS. In the present embodiment, the light having predetermined intensity outputted from the light source 33 is intensity-modulated based on the luminance signal YS. Also in this case, as with the first embodiment, light having intensity according to the luminance signal YS can be emitted.

According to the present embodiment, as with the first embodiment, the optical modulation apparatus can be so realized as to be able to increase the number of gradations of the light outputted from the light valve 35 without increasing the frequency of the clock signal which serves as a unit of ON/OFF control.

Fourth Embodiment

Figure 13:
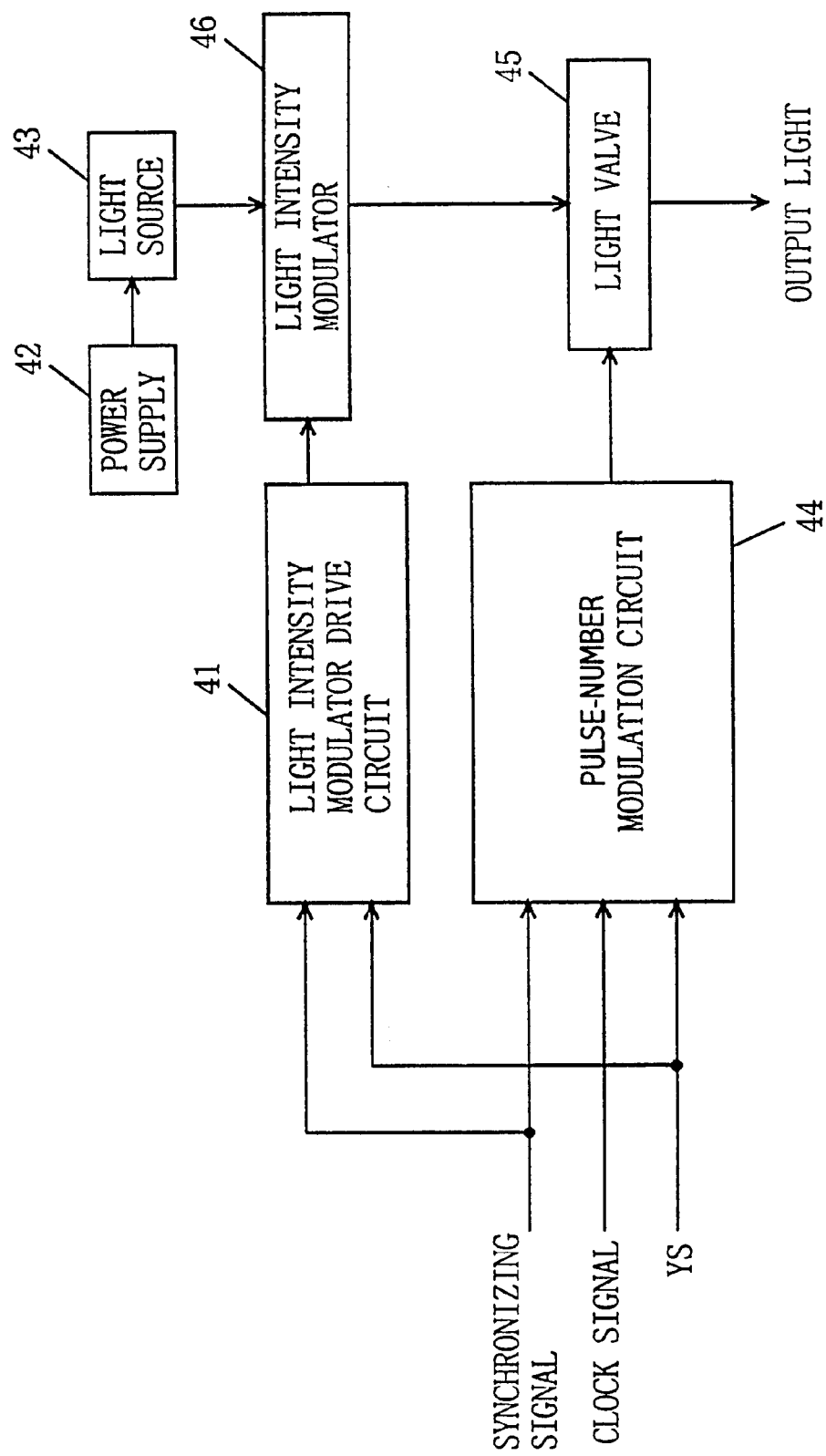
FIG. 13 is a block diagram showing the structure of an optical modulation apparatus according to a fourth embodiment of the present invention.

FIG. 13 is a block diagram showing the structure of an optical modulation apparatus according to a fourth embodiment of the present invention. In FIG. 13, the optical modulation apparatus includes a light intensity modulator drive circuit 41, a power supply 42, a light source 43, a pulse-number modulation circuit 44, a light valve 45, and a light intensity modulator 46. The light intensity modulator drive circuit 41, the power supply 42, the light source 43, the light valve 45, and the light intensity modulator 46 are equivalent to the light intensity modulator drive circuit 31, the power supply 32, the light source 33, the light valve 35, and the light intensity modulator 36 in FIG. 12, respectively, and operate similarly.

In other words, the present light modulation apparatus is structured by replacing the pulse-width modulation circuit 34 of the light modulation apparatus described in the third embodiment with the pulse-number modulation circuit 44. The pulse-number modulation circuit 44 is equivalent to the pulse-number modulation circuit 24 of FIG. 9 (refer to the second embodiment), and operates similarly.

According to the present embodiment, as with the third embodiment, the optical modulation apparatus can be so realized as to be able to increase the number of gradations of the light outputted from the light valve 45 without increasing the frequency of the clock signal which serves as a unit of ON/OFF control.

In the above first through fourth embodiments, description has been made on the assumption that the light valve has only a single pixel. In such case, only one pulse-width modulation circuit (or number-of pulses modulation circuit) is required for ON/OFF control of the light valve.

As described in Background Art section, however, when a light valve having a plurality of pixels (refer to FIG. 23) is used, a plurality of pulse-width modulation circuits (or pulse-number modulation circuits) are required corresponding to those pixels. A value of the luminance signal YS corresponding to the pixel is supplied to the corresponding pulse-width modulation circuit. Therefore, unlike the above first through fourth embodiments, the light intensity modulation circuit (or light intensity modulator drive circuit) cannot generate an intensity modulating signal based on the luminance signal YS.

Therefore, in the following fifth through eighth embodiments, described is an optical modulation apparatus capable of density modulation (pulse-width modulation or pulse-number modulation) and intensity modulation even if the light valve has a plurality of pixels.

Fifth Embodiment

Figure 14:
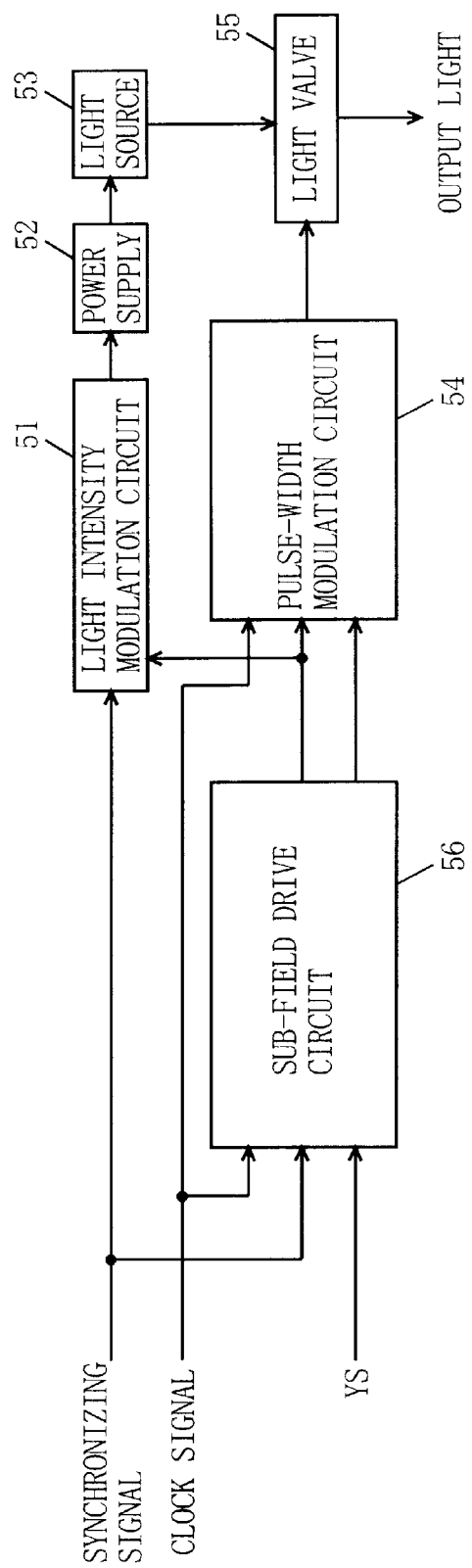
FIG. 14 is a block diagram showing an optical modulation apparatus according to a fifth embodiment of the present invention.

FIG. 14 is a block diagram showing the optical modulation apparatus according to the fifth embodiment of the present invention. In FIG. 14, the present optical modulation apparatus includes a light intensity modulation circuit 51, a power supply 52, a light source 53, a pulse-width modulation circuit 54, a light valve 55, and a sub-field drive circuit 56. The power supply 52, the light source 53, and the light valve 55 are equivalent to the power supply 12, the light source 13, and the light valve 15 in FIG. 1, respectively, and operate similarly.

Note that, for the purpose of simplifying description, the light valve 55 used herein has only a single pixel. However, a light valve having a plurality of pixels exemplary shown in FIG. 23 may be used. In this case, a sub-field drive circuit 56 and a pulse-width modulation circuit 54 are required for each of those pixels (except when all YS values are different from each other), but the additional sub-field drive circuits 56 operate in the same manner, and the additional pulse-width modulation circuits 54 operate in the same manner.

The sub-field drive circuit 56 is supplied with a luminance signal YS, a frame synchronizing signal, and a clock signal for each frame period, and generates, based on these signals, a sub-field synchronizing signal and a luminance signal YS' for each sub-field period.

Figure 15:
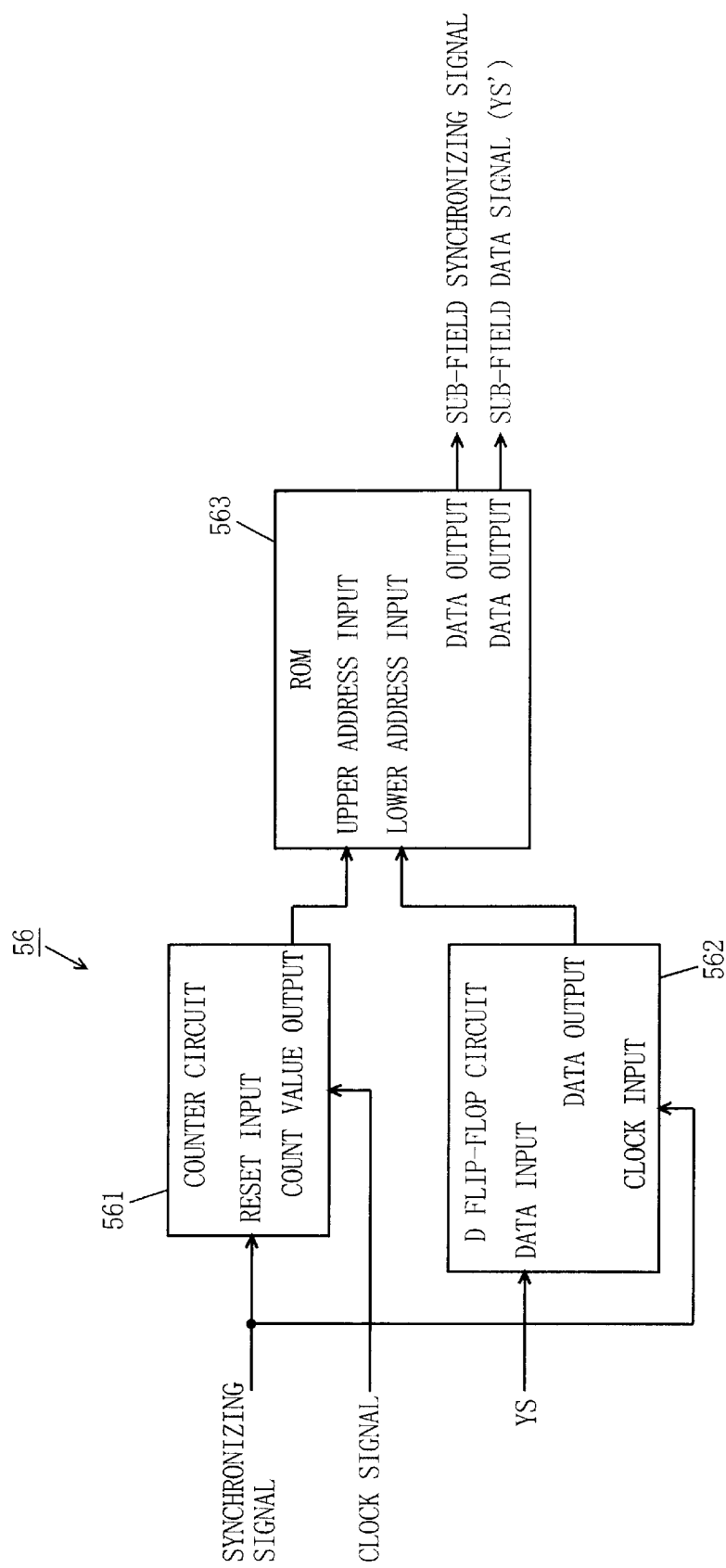
FIG. 15 is a block diagram showing one example of structure of a sub-field drive circuit 56 of FIG. 14.

FIG. 15 is a block diagram showing one example of structure of the sub-field drive circuit 56 of FIG. 14. In FIG. 15, the sub-field drive circuit 56 includes a counter circuit 561, a D flip-flop circuit 562, and ROM 563.

In FIG. 15, when the sub-field drive circuit 56 is supplied with the synchronizing signal, the counter circuit 561 is reset to "0". Simultaneously, the luminance signal YS is taken in by the D flip-flop circuit 562.

In the RAM 563, a table (not shown) describing a correspondence between input addresses and output data is stored. The ROM 563 outputs, according to an upper address input from the counter circuit 561 and a lower address input from the D flip-flop circuit 562, data corresponding to the sub-field synchronizing signal and data corresponding to the luminance signal YS' for each sub-field period. Thus, the sub-field drive circuit 56 is so realized as to output the luminance signal YS' for each sub-field period and the sub-field synchronizing signal, based on the luminance signal YS for each frame period, the frame synchronizing signal, and the clock signal.

Again in FIG. 14, the light intensity modulation circuit 51 is supplied with the frame synchronizing signal (from a video display apparatus) and the sub-field synchronizing signal (from the sub-field drive circuit 56), and generates, based on these signals, an intensity modulating signal for each sub-field period for output to the power supply 52. This causes the light-source 53 to output light having each predetermined intensity for each sub-field period. This light intensity modulation circuit 51 is realized by ROM. (not shown) having data stored therein, the data corresponding to the intensity modulating signal for each sub-field period.

The pulse-width modulation circuit 54 is supplied with the sub-field synchronizing signal from the sub-field drive circuit 56 and the luminance signal YS' for the sub-field period, and generates, based on these signals, a pulse-width modulating signal for output to the light valve 55, thereby causing the light valve 55 to output pulse-width modulated light according to the luminance signal for each sub-field period.

This pulse-width modulation circuit 54 is realized in a similar manner to that for the pulse-width modulation circuit 14. Only the difference there between is that the pulse-width modulation circuit 14 of FIG. 1 is supplied with the synchronizing signal from the video display apparatus, while the pulse-width modulation circuit 54 is supplied with the sub-field synchronizing signal outputted from the sub-field drive circuit 56.

The operating waveform of the above structured optical modulation apparatus is similar to that shown in FIG. 6 (or FIG. 7 or 8), which is also cited herein. However, in the present embodiment, the waveform for one frame period corresponds the entire waveform shown in FIG. 6, and is divided into first to four sub-field periods. In other words, the first to fourth frame periods shown in the drawing correspond to the first to fourth sub-field periods herein, respectively (that is, one frame period is equal to four sub-field periods, and one sub-field period is equal to eight clock periods).

In FIG. 6, the present optical modulation apparatus outputs light having the luminance "0" or "8" for each sub-field during the first sub-field period, the light having the luminance "0" or "4" during the second sub-field period, the light having the luminance "0" or "2" during the third sub-field period, and the light having the luminance "0" or "1" during the fourth sub-field period. Therefore, for one frame period, light of sixteen gradations (=$2^4$) including "0" can be outputted, that is, light having sixteen types of luminance, 0 (=0+0+0+0), 1 (=0+0+0+1), 2 (=0+0+2+0), 3 (=0+0+2+1), . . . , and 15 (=8+4+2+1), can be outputted.

In other words, when receiving the pulse-width modulating signal (ON/OFF control pulses) shown in FIG. 6, the light valve 55 is turned ON at the density of fifteen clock periods per one frame (32 clock periods), according the waveform of the pulses. Therefore, from the light valve 55, light having the luminance "15" for one frame is outputted.

Also, in the pulse-width modulating signal exemplary shown in FIG. 6, if the output light intensity of the light source 53 during the fourth sub-field is changed from "1" to "0", the output light luminance of the light valve 55 for one frame period becomes "14". Similarly, in the pulse-width modulating signal shown in FIG. 6, if the output light intensity of the, light source 53 during the third sub-field period is changed from "2" to "0", the output light luminance of the light valve 55 for one frame period becomes "13".

As such, in the present optical modulation apparatus, one frame period is divided into a plurality (here, four) sub-field periods, and light having each predetermined intensity for each sub-field period is emitted. Also, a luminance signal for each sub-field period is generated, and the light is so controlled as to become ON at the density according to the luminance signal. With this, light having the luminance according to the luminance signal YS for each frame period is outputted. In other words, unlike the optical modulation apparatus described in the first embodiment, the output light of the light source 53 is intensity-modulated, independently of the value of the luminance signal YS for each frame period. Therefore, even if the light valve 55 has a plurality of pixels, intensity modulation and density modulation as described above can be carried out.

As stated above, according to the present embodiment, through the light valve 55, the light from the light source 53 is ON/OFF-controlled (pulse-width modulated), and also the electric power supplied to the light source 53 is controlled, thereby also modulating the output light intensity of the light source 53. Therefore, the optical modulation apparatus is able to increase the number of gradations of the light outputted from the light valve without increasing the frequency of the clock signal that serves as a unit of ON/OFF control.

Moreover, in the present embodiment, light having each predetermined intensity for each sub-field period is emitted, while a luminance signal for each sub-field period is generated and the light is controlled to become ON at the density according to the luminance signal. Therefore, even if the light valve 55 has a plurality of pixels, intensity modulation and density modulation as described above can be carried out. As a result, the optical modulation apparatus is able to increase the number of gradations of the light outputted from the light valve 55 without increasing the frequency of the clock signal that serves as a unit of ON/OFF control, even if the light valve 55 has a plurality of pixels.

Sixth Embodiment

Figure 16:
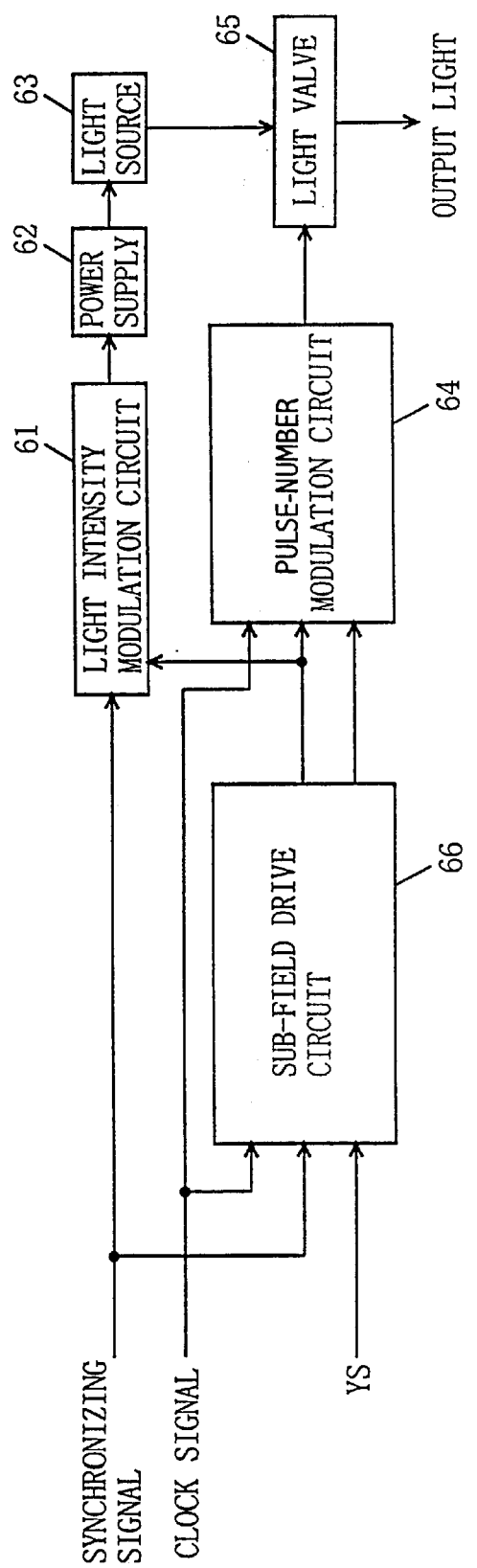
FIG. 16 is a block diagram showing the structure of an optical modulation apparatus according to a sixth embodiment of the present invention.

FIG. 16 is a block diagram showing the structure of the optical modulation apparatus according to the sixth embodiment of the present invention. In FIG. 16, the present optical modulation apparatus includes a light intensity modulation circuit 61, a power supply 62, a light source 63, a pulse-number modulation circuit 64, a light valve 65, and a sub-field drive circuit 66. The light intensity modulation circuit 61, the power supply 62, the light source 63, the light valve 65, and the sub-field drive circuit 66 are equivalent to the light intensity modulation circuit 51, the power supply 52, the light source 53, the light valve 54, and the sub-field drive circuit 56 in FIG. 14 (refer to the fifth embodiment), respectively, and operate similarly.

In other words, the present optical modulation apparatus is structured by replacing the pulse-width modulation circuit 54 in the optical modulation apparatus described in the fifth embodiment with the pulse-number modulation circuit 64. The pulse-number modulation circuit 64 is equivalent to the pulse-number modulation circuit 24 in FIG. 9 (refer to the second embodiment), and operates similarly.

According to the present embodiment, as with the fifth embodiment, the optical modulation apparatus is so realized as to be able to increase the number of gradations of the light outputted from the light valve 65 without increasing the frequency of the clock signal that serves as a unit of ON/OFF control, even if the light valve 65 has a plurality of pixels.

Seventh Embodiment

Figure 17:
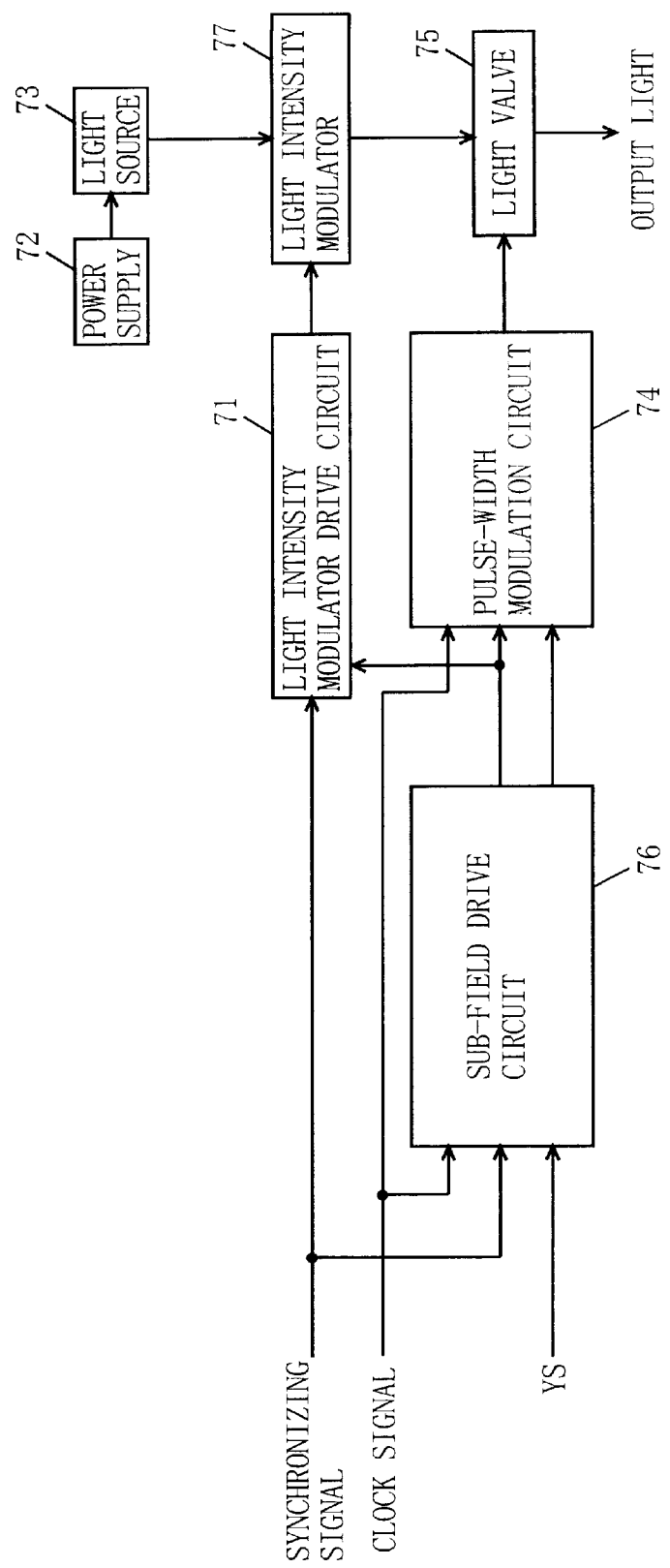
FIG. 17 is a block diagram showing the structure of an optical modulation apparatus according to a seventh embodiment of the present invention.

FIG. 17 is a block diagram showing the structure of the optical modulation apparatus according to the seventh embodiment of the present invention. In FIG. 17, the present optical 10 modulation apparatus includes a light intensity modulator drive circuit 71, a power supply 72, a light source 73, a pulse-width modulation circuit 74, a light valve 75, a sub-field drive circuit 76, and a light intensity modulator 77.

The pulse-width modulation circuit 74, the sub-field drive circuit 76, and the light valve 75 are equivalent to the pulse-width modulation circuit 54, the sub-field drive circuit 56, and the light valve 55 in FIG. 14 (refer to the fifth embodiment), respectively, and operate similarly. The power supply 72, the light source 73, and the light intensity modulator 77, and the light intensity modulator drive circuit 71 are equivalent to the power supply 32, the light source 33, the light intensity modulator 36, and the light intensity modulator drive circuit 31 in FIG. 12 (refer to the third embodiment), respectively, and operate similarly.

According to the present embodiment, as with the fifth embodiment, the optical modulation apparatus is able to increase the number of gradations of the light outputted from the light valve 75 without increasing the frequency of the clock signal that serves as a unit of ON/OFF control, even if the light valve 75 has a plurality of pixels.

Eighth Embodiment

Figure 18:
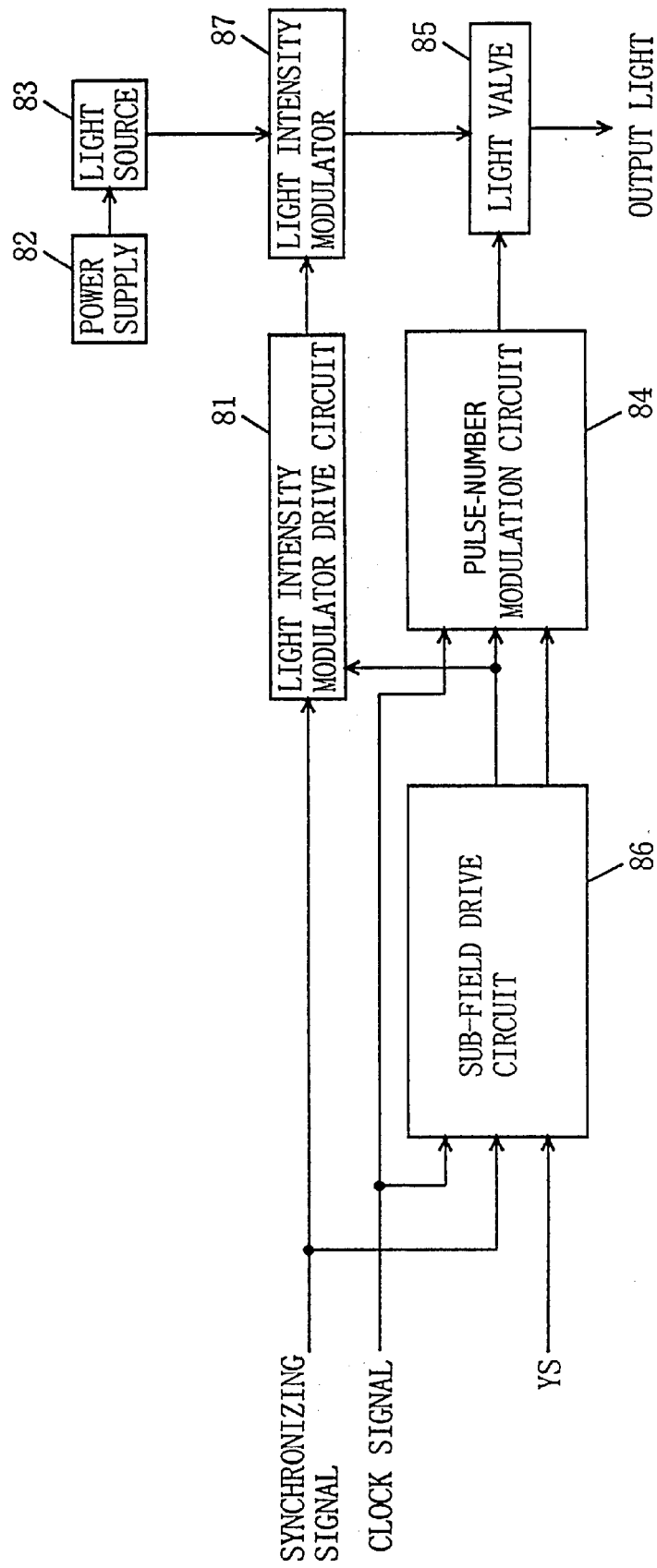
FIG. 18 is a block diagram showing the structure of an optical modulation apparatus according to an eighth embodiment of the present invention.
Figure 21:
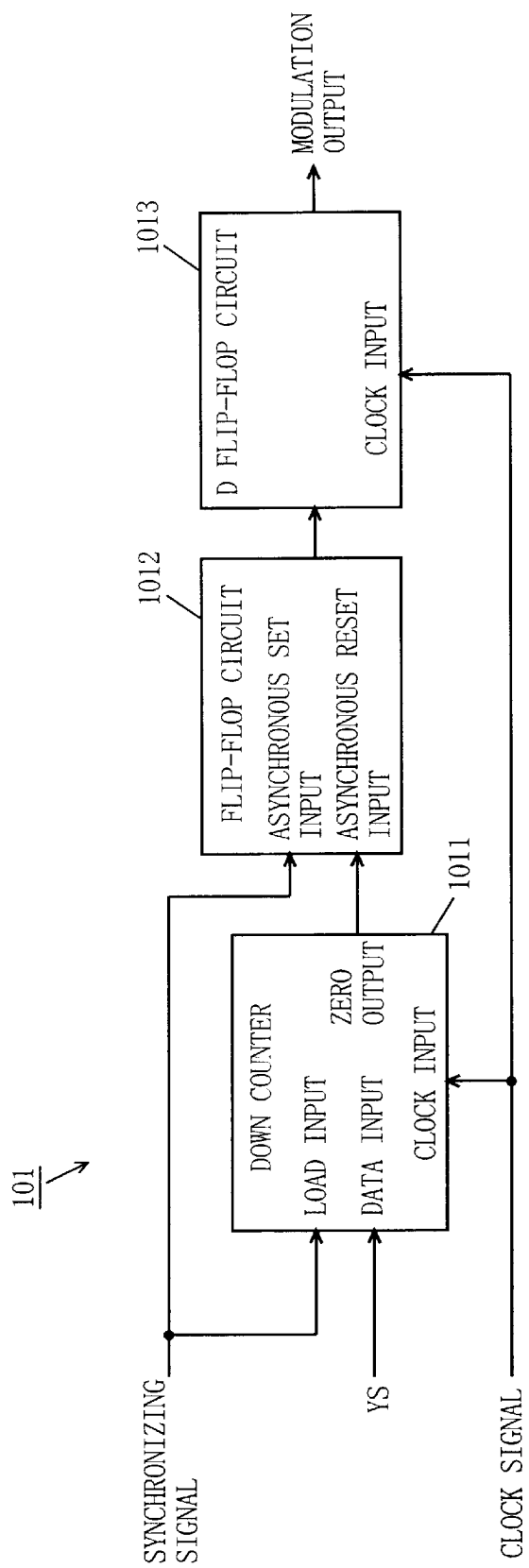
FIG. 21 is a block diagram showing one example of structure of a pulse-width modulation circuit 101 of FIG. 20.

FIG. 18 is a block diagram showing the structure of the optical modulation apparatus according to the eight embodiment of the present invention. In FIG. 18, the optical modulation apparatus includes a light intensity modulator drive circuit 81, a power supply 82, a light source 83, a pulse-number modulation circuit 84, a light valve 85, and a sub-field drive circuit 86, and a light intensity modulator 87. The light intensity modulator drive circuit 81, the power supply 82, the light source 83, the sub-field drive circuit 86, the light intensity modulator 87, and the light valve 85 are equivalent to the light intensity modulator drive circuit 71, the power supply 72, the light source 73, the sub-field drive circuit 76, the light intensity modulator 77, and the light valve 75 in FIG. 17 (refer to the seventh embodiment), respectively, and operate similarly.

In other words, the present optical modulation apparatus is structured by replacing the pulse-width modulation circuit 74 of the optical modulation apparatus described in the seventh embodiment with the pulse-number modulation circuit 84. The pulse-number modulation circuit 84 is equivalent to the pulse-number modulation circuit 24 in FIG. 9 (refer to the second embodiment), and operates similarly.

According to the present embodiment, as with the seventh embodiment, the optical modulation apparatus is able to increase the number of gradations of the light outputted from the light valve 85 without increasing the frequency of the clock signal that serves as a unit of ON/OFF control, even if the light valve 75 has a plurality of pixels.

Note that in the above fifth through eighth embodiments, the optical modulation apparatus outputs light, having the luminance "0" or "8" for each sub-field during the first sub-field period, the light having the luminance "0" or "4" during the second sub-field period, the light having the luminance "0" or "2" during the third sub-field period, and the light having the luminance "0" or "1". However, the combination, of luminance values of the light outputted by the optical modulation apparatus for each sub-field is not restricted to this example. Another example is shown in FIG. 19.

INDUSTRIAL APPLICABILITY

As described above, according to the present invention, realized is the optical modulation apparatus using a light source and a device for carrying out ON/OFF control of output light of the light source. The optical modulation apparatus is able to increase the number of gradations of light outputted from the device without increasing the frequency of a clock signal that serves as a unit of ON/OFF control of the output light of the light source.

What is claimed is:

1. An optical modulation apparatus for outputting light having a luminance according to a luminance signal, said apparatus comprising:
   a light-emitter operable to emit light;
   a light intensity modulator operable to control, based on the luminance signal, an intensity of the light emitted from said light-emitter; and
   an ON/OFF controller operable to carry out ON/OFF control of the light from said light-emitter based on the luminance signal, a synchronizing signal, and a clock signal, and to output light having a luminance according to the luminance signal,
   wherein, said light intensity modulator is operable to cause said light-emitter to output light at a predetermined intensity, when a value of said luminance signal is not less than a predetermined value, while said ON/OFF controller is operable to output the light at an amount according to the intensity of the luminance signal, and wherein said light intensity modulator is operable to cause said light-emitter to output light at an intensity that is smaller than the predetermined intensity and is in accordance with the luminance signal when the value of the luminance signal is less than the predetermined value, while said ON/OFF controller outputs light at predetermined amount.

2. The optical modulation apparatus according to claim 1, wherein the predetermined value is a signal value that corresponds to a luminance of the light outputted from said ON/OFF controller that is obtained by controlling the light from said light-emitter to become ON at an amount during one cycle of the clock signal for one cycle of the synchronizing signal.

3. The optical modulation apparatus according to claim 2, wherein said light-emitter includes a light source, a power supply for supplying electric power to said light source and a light intensity modulation circuit, capable of receiving the luminance signal and the synchronizing signal, said light intensity modulation circuit being operable to generate, based on those signals, an intensity modulating signal and to output the intensity modulating signal to said power supply, thereby causing said light source to output light that is intensity-modulated according to the luminance signal, and wherein said ON/OFF controller includes a light valve, capable of receiving light from said light source, and a pulse-width modulation circuit, capable of receiving the luminance signal, the synchronizing signal and the clock signal, said pulse-width modulation circuit being operable to generate, based on those signals, a pulse-width modulating signal and to output the pulse-width modulating signal to said light valve, thereby causing the light valve to output light that is pulse-width modulated according to the luminance signal.

4. The optical modulation apparatus according to claim 2, wherein said light-emitter includes a light source and a light intensity modulation circuit capable of receiving the luminance signal and the synchronizing signal, said light intensity modulation circuit being operable to generate, based on those signal, an intensity modulating signal and to output the intensity modulating signal to said power supply, thereby causing said light source to output light that is intensity modulated according to the luminance signal, and wherein said ON/OFF control means includes a light valve, capable of receiving the light from said light source, and a pulse-number modulation circuit, capable of receiving the luminance signal, the synchronizing signal and the clock signal, said pulse-number modulation circuit being operable to generate, based on those signals, a pulse-number modulating signal and to output the pulse-number modulating signal to said light valve, thereby causing the light valve to output light that is pulse-number modulated according to the luminance signal.

5. The optical modulation apparatus according to claim 2, wherein said light-emitter includes a light source, a power supply operable to supply predetermined electric power to said light source, a light intensity modulator operable to intensity modulate light outputted from said light source and a light intensity modulator drive circuit capable of receiving the luminance signal and the synchronizing signal, said light intensity modulator drive circuit being operable to generate, based on those signals, an intensity modulating signal and to output the intensity modulating signal to said light intensity modulator, thereby causing the light intensity modulator to output light that is intensity-modulated according to the luminance signal, and wherein said ON/OFF controller includes a light valve, capable of receiving the light from said light intensity modulator, and a pulse-width modulation circuit, capable of receiving the luminance signal, the synchronizing signal and the clock signal, said pulse-width modulation circuit being operable to generate, based on those signals, a pulse-width modulating signal and to output the pulse-width modulating signal to said light valve, thereby causing the light valve to output light that is pulse-width modulated according to the luminance signal.

6. The optical modulation apparatus according to claim 2, wherein said light-emitter includes a light source, a power supply, operable to supply predetermined electric power to said light source, and a light intensity modulator drive circuit capable of receiving the luminance signal and the synchronizing signal, said light intensity modulator drive circuit being operable to generate, based on those signals, an intensity modulating signal, and to output the intensity modulating signal to said light intensity modulator, thereby causing the light intensity modulator to output light that is intensity-modulated according to the luminance signal, and wherein said ON/OFF controller includes a light valve capable of receiving the light from said light intensity modulator; and a pulse-number modulation circuit capable of receiving the luminance signal, the synchronizing signal and the clock-signal, said pulse-number modulation circuit being operable to generate, based on those signals, a pulse-number modulating signal and to output the pulse-number modulating signal to said light valve, thereby causing the light valve to output light that is pulse-number modulated according to the luminance signal.

* * * * *